(12) United States Patent
He et al.

(10) Patent No.: US 10,897,776 B2
(45) Date of Patent: Jan. 19, 2021

(54) DOWNLINK CONTROL INFORMATION DESIGN WITH SHORTER TTI

(71) Applicant: Apple Inc., Cupertino, CA (US)

(72) Inventors: Hong He, Beijing (CN); Gang Xiong, Beaverton, OR (US); Hwan-Joon Kwon, Portland, OR (US); Seunghee Han, San Jose, CA (US); Alexei Vladimirovich Davydov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/346,335

(22) PCT Filed: Oct. 26, 2017

(86) PCT No.: PCT/US2017/058611
§ 371 (c)(1),
(2) Date: Apr. 30, 2019

(87) PCT Pub. No.: WO2018/085118
PCT Pub. Date: May 11, 2018

(65) Prior Publication Data
US 2019/0268931 A1    Aug. 29, 2019

Related U.S. Application Data

(60) Provisional application No. 62/416,011, filed on Nov. 1, 2016.

(51) Int. Cl.
*H04W 72/12* (2009.01)
*H04W 76/28* (2018.01)
(Continued)

(52) U.S. Cl.
CPC ...... *H04W 72/1289* (2013.01); *H04B 7/2615* (2013.01); *H04L 5/0053* (2013.01); *H04W 76/28* (2018.02)

(58) Field of Classification Search
None
See application file for complete search history.

(56) References Cited

U.S. PATENT DOCUMENTS

2017/0273103 A1* 9/2017 Liu ............... H04W 72/1289
2017/0280429 A1* 9/2017 Shen ............. H04W 72/0406
(Continued)

FOREIGN PATENT DOCUMENTS

WO    WO-2018085118 A1    5/2018

OTHER PUBLICATIONS

"Discussion on sPDCCH for sTTI", ZTE, R1-1609341, 3GPP TSG RAN WG1 Meeting #86bis, Lisbon, Portugal,, (Oct. 1, 2016).
(Continued)

*Primary Examiner* — Bunjob Jaroenchonwanit
(74) *Attorney, Agent, or Firm* — Kowert, Hood, Munyon, Rankin & Goetzel, P.C.

(57) ABSTRACT

Downlink control information techniques for wireless communications with shorter TTI (S-TTI) length are disclosed. An apparatus of a user equipment (UE) can include processing circuitry configured to decode signaling indicating a duration of a time window, the time window comprising a plurality of S-TTIs forming a single TTI. Absence of a discontinuous reception (DRX) indicator is detected within control information received within a first S-TTI of the plurality of S-TTIs. Upon detecting the absence of the DRX indicator within received control information, a S-PDCCH within each of the plurality of S-TTIs is monitored during the duration. Scheduling information received via the S-PDCCH within one of the plurality of S-TTIs is decoded, and data is encoded for transmission on a shared data channel based on the scheduling information.

25 Claims, 14 Drawing Sheets

(51) Int. Cl.
H04B 7/26 (2006.01)
H04L 5/00 (2006.01)

(56) References Cited

U.S. PATENT DOCUMENTS

| | | | | |
|---|---|---|---|---|
| 2017/0290004 A1* | 10/2017 | Yang | | H04W 72/0446 |
| 2017/0290046 A1* | 10/2017 | Sun | | H04W 72/082 |
| 2017/0325164 A1* | 11/2017 | Lee | | H04W 72/042 |
| 2017/0332365 A1* | 11/2017 | Lin | | H04L 5/0091 |
| 2017/0332377 A1* | 11/2017 | Tseng | | H04W 72/042 |
| 2017/0332397 A1* | 11/2017 | Li | | H04L 1/1887 |
| 2017/0338988 A1* | 11/2017 | Yin | | H04L 5/0082 |
| 2018/0041993 A1* | 2/2018 | Xu | | H04W 72/042 |
| 2018/0049197 A1* | 2/2018 | Patel | | H04L 5/0053 |
| 2018/0049226 A1* | 2/2018 | Chen | | H04L 5/0055 |
| 2018/0049272 A1* | 2/2018 | Bagheri | | H04W 72/042 |
| 2018/0098337 A1* | 4/2018 | Lee | | H04W 72/1273 |
| 2018/0206266 A1* | 7/2018 | Byun | | H04W 72/1289 |
| 2018/0220419 A1* | 8/2018 | Takeda | | H04W 72/0446 |
| 2018/0234998 A1* | 8/2018 | You | | H04L 5/0053 |
| 2018/0288745 A1* | 10/2018 | Davydov | | H04L 5/0044 |
| 2018/0310282 A1* | 10/2018 | Shi | | H04W 72/042 |
| 2019/0052332 A1* | 2/2019 | Shimezawa | | H04W 72/042 |
| 2019/0098622 A1* | 3/2019 | Lee | | H04W 72/0446 |
| 2019/0116583 A1* | 4/2019 | Sahlin | | H04L 5/0092 |
| 2019/0116592 A1* | 4/2019 | Moon | | H04L 5/0092 |
| 2019/0124680 A1* | 4/2019 | Li | | H04L 5/14 |
| 2019/0141679 A1* | 5/2019 | He | | H04W 72/042 |
| 2019/0191435 A1* | 6/2019 | Gao | | H04W 72/0446 |
| 2019/0229879 A1* | 7/2019 | Yi | | H04L 5/0082 |
| 2019/0229965 A1* | 7/2019 | Wu | | H04W 72/1273 |
| 2019/0230634 A1* | 7/2019 | Schober | | H04W 72/042 |
| 2019/0253291 A1* | 8/2019 | You | | H04L 5/0082 |
| 2019/0289586 A1* | 9/2019 | Ouchi | | H04L 27/2602 |
| 2019/0296864 A1* | 9/2019 | Li | | H04L 1/1819 |
| 2019/0342909 A1* | 11/2019 | Lee | | H04W 72/04 |
| 2019/0349046 A1* | 11/2019 | Liu | | H04B 7/063 |
| 2019/0349175 A1* | 11/2019 | Bagheri | | H04W 72/0446 |
| 2019/0387521 A1* | 12/2019 | Gao | | H04W 72/1278 |
| 2020/0015215 A1* | 1/2020 | Bagheri | | H04L 41/08 |
| 2020/0029354 A1* | 1/2020 | Hwang | | H04W 72/1273 |
| 2020/0154420 A1* | 5/2020 | Horiuchi | | H04L 5/0055 |
| 2020/0170034 A1* | 5/2020 | Kim | | H04L 1/18 |

OTHER PUBLICATIONS

"Discussions on sPDCCH for latency reduction", LG Electronics, R1-1609214, 3GPP TSG RAN WG1 Meeting #86bis, Lisbon, Portugal, (Oct. 1, 2016).
"International Application Serial No. PCT/US2017/058611, International Search Report dated Jan. 30, 2018", 3 pgs.
"International Application Serial No. PCT/US2017/058611, Written Opinion dated Jan. 30, 2018", 7 pgs.
"sPDCCH for 1-slot sTTI", Samsung, R1-1609003, 3GPP TSG RAN WG1 Meeting #86bis, Lisbon, Portugal, (Sep. 30, 2016).
"sPDSCH/sPDCCH with 2-symbol sTTI and 1-slot sTTI", NEC, R1-1609157, 3GPP TSG RAN WG1 Meeting #86bis, Lisbon, Portugal, (Sep. 30, 2016).
Huawei, et al., "Details of two-level DCI schemes for short TTI", R1-1608634, 3GPP TSG RAN WG1 Meeting #86bis, Lisbon, Portugal, (Oct. 1, 2016).

* cited by examiner

DOWNLINK CONTROL INFORMATION DESIGN WITH SHORTER TTI

PRIORITY CLAIM

This application is a U.S. National Stage Filing under 35 U.S.C. 371 from International Application No. PCT/US2017/058611, filed on Oct. 26, 2017, which claims the benefit of priority to U.S. Provisional Patent Application Ser. No. 62/416,011, filed Nov. 1, 2016, and entitled "DOWNLINK CONTROL INFORMATION DESIGN FOR WIRELESS COMMUNICATION WITH SHORTEN TTI LENGTH," each of which are incorporated herein by reference in their entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, and fifth-generation (5G) networks including new radio (NR) networks. Other aspects are directed to downlink control information (DCI) design with shorter transmission time interval (S-TTI).

BACKGROUND

Mobile communication has evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in a number of disparate environments. The use of networked UEs using 3GPP LTE systems has increased in all areas of home and work life. Fifth generation (5G) wireless systems are forthcoming, and are expected to enable even greater speed, connectivity, and usability.

Packet data latency is a key performance metric in today's mobile communication systems. Packet data latency is important not only for the perceived responsiveness of the communication system, but it is also a parameter that influences the throughput.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

Figure 1A:
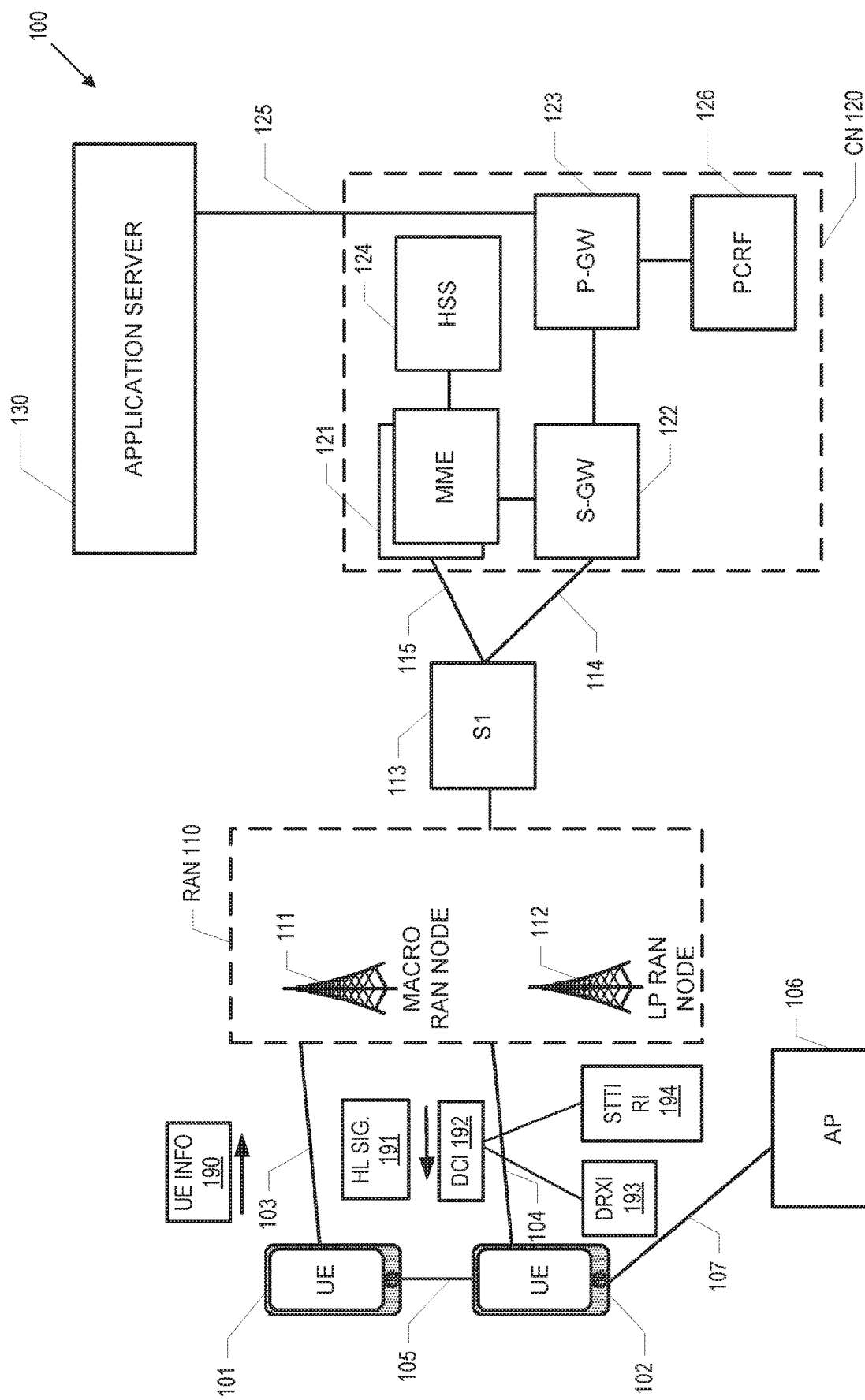
FIG. 1A illustrates an architecture of a network in accordance with some aspects.

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others, etc.

Aspects described herein can be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc). Note that some bands are limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

FIG. 1A illustrates an architecture of a network in accordance with some aspects. The network 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some aspects, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this aspect, the UEs 101 and 102 may further directly exchange communication data via a ProSe interface 105.

The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a new generation node-B (gNB), an eveloved node-B (eNB) or another type of RAN node.

In accordance with some aspects, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the aspects is not limited in this respect. The OFDM signals can comprise a plurality of orthogonal subcarriers.

In some aspects, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some aspects may use concepts for resource allocation for control channel information that are an extension of the above-described concepts. For example, some aspects may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN. In this aspect the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this aspect, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

In an example, any of the nodes 111 or 112 can be configured to communicate to the UEs 101/102 (e.g., dynamically) an antenna panel selection and a receive (Rx) beam selection that should be used by the UE for data reception on a physical downlink shared channel (PDSCH) as well as for channel state information reference signal (CSI-RS) measurements and channel state information (CSI) calculation.

In an example, any of the nodes 111 or 112 can be configured to communicate to the UEs 101/102 (e.g., dynamically) an antenna panel selection and a transmit (Tx) beam selection that should be used by the UE for data transmission on a physical uplink shared channel (PUSCH) as well as for sounding reference signal (SRS) transmission.

In some aspects, LTE-based communications can use a fixed transmission time interval (TTI) length of 1 ms with 12-14 symbols. The transmission of a request, grant, or data can be achieved by using one or more subframes with a TTI. In this regard, the TTI length can impact both the time for transmitting over the air as well as the processing time at transmitters and receivers.

In accordance with some techniques and aspects described herein, packet latency can be reduced with a reduction of transport time of data and control by shortening the current TTI length. More specifically, multiple shorter TTI's (S-TTIs) can be configured for a given time window (e.g., a subframe) with a fixed TTI length. One or more of the nodes 111 and 112 can use UE information 190 to configure a duration of the time window. Time window duration can be communicated to the UEs 101 and 102 by higher layer signaling 191. Additionally, nodes 111 and 112 can communicate DCI 192, which can include one or more indicators (e.g., 193 and 194) for activating or deactivating S-TTI related operations. In some aspects, indicator 193 can be a discontinuous reception (DRX) indicator, which can be used by the receiving UE to discontinue monitoring of a physical downlink control channel within each of the S-TTI's. In some aspects, indicator 194 can be an S-TTI release indicator, which can be used by the receiving UE to deactivate S-TTI monitoring. Further description of the S-TTI related operations as well as the DRX indicator and the S-TTI release indicator are provided herein below in reference to FIGS. 7-13.

Figure 1B:
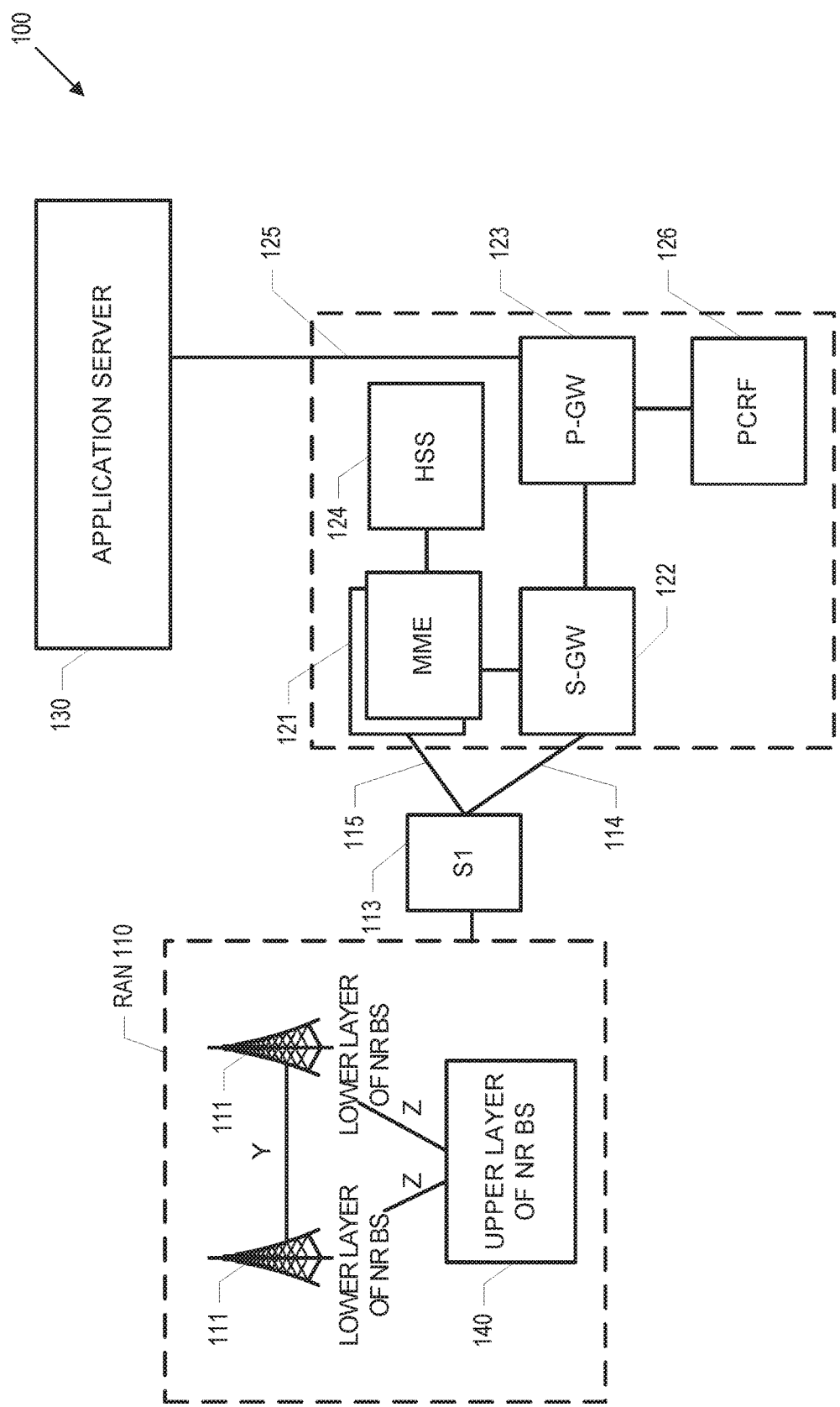
FIG. 1B is a simplified diagram of a next generation wireless network in accordance with some aspects.

FIG. 1B is a simplified diagram of a next generation wireless network in accordance with some aspects. The wireless network may be similar to that shown in FIG. 1A but may contain components associated with a 5G network. The wireless network may contain, among other elements not shown, a RAN 110 coupled to the core network 120 (as well as to the Internet which can connect the core network 120 with other core networks 120). In some aspects, the RAN 110 and the core network 120 may be a next generation (5G) 3GPP RAN and 5G core network, respectively. The RAN 110 may include an upper layer of a new generation node-B (gNB) (also referred to as a new radio (NR) base station (BS) (ULNRBS)) 140 and multiple lower layers of different gNBs (NR BS (LLNRBS)) 111. The LLNRBSs 111 can be connected to the ULNRBS 140 via a Z interface. The Z interface can be open or proprietary. In some examples, the LLNRBS 111 can be referred to as a transmission-reception point (TRP). If the Z interface is proprietary, then the ULNRBS 140 and the LLNRBS 111 may be provided by the same vendor. The LLNRBS 111 can be connected by a Y interface, which may be equivalent to the LTE X2 interface. The ULNRBS 140 may be connected to the core network 120 through the S1 interface 113.

As used herein, the term circuitry may refer to, be part of, or include an Application Specific Integrated Circuit (ASIC), an electronic circuit, a processor (shared, dedicated, or group), or memory (shared, dedicated, or group) that executes one or more software or firmware programs, a combinational logic circuit, or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware. Aspects described herein may be implemented into a system using any suitably configured hardware or software.

Figure 2:
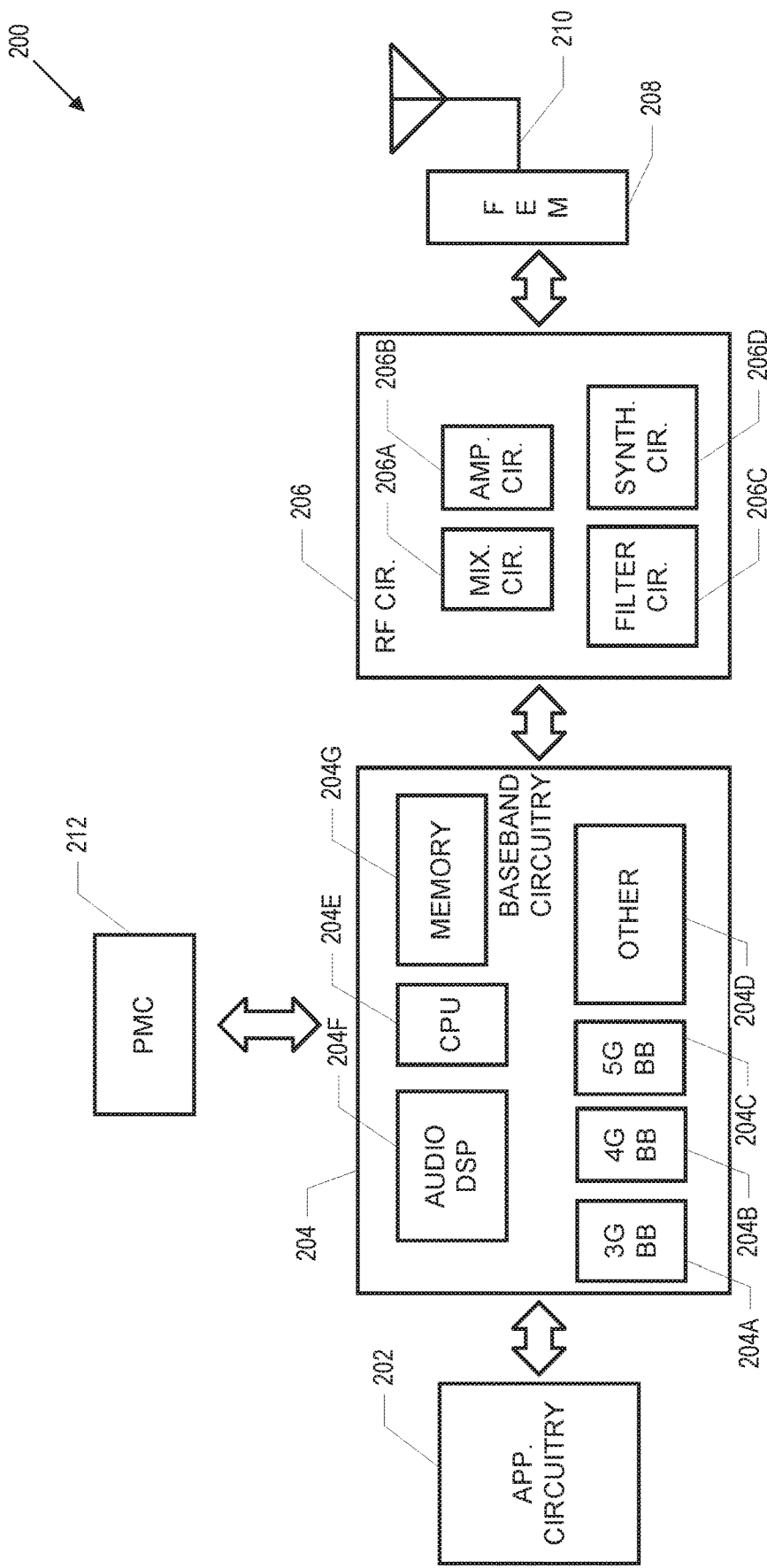
FIG. 2 illustrates example components of a device 200 in accordance with some aspects.

FIG. 2 illustrates example components of a device 200 in accordance with some aspects. In some aspects, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some aspects, the device 200 may include less elements (e.g., a RAN node may not utilize application circuitry 202, and instead include a processor/controller to process IP data received from an EPC). In some aspects, the device 200 may include additional elements such as, for example, memory/storage, display, camera, sensor, or input/output (I/O) interface. In other aspects, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some aspects, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some aspects, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other aspects, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some aspects, modulation/demodulation circuitry of the baseband circuitry 204 may include Fast-Fourier Transform (FFT), precoding, or constellation mapping/demapping functionality. In some aspects, encoding/decoding circuitry of the baseband circuitry 204 may include convolution, tail-biting convolution, turbo, Viterbi, or Low Density Parity Check (LDPC) encoder/decoder functionality. Aspects of modulation/demodulation and encoder/decoder functionality are not limited to these examples and may include other suitable functionality in other aspects.

In some aspects, the baseband circuitry 204 may include one or more audio digital signal processor(s) (DSP) 204F. The audio DSP(s) 204F may be include elements for compression/decompression and echo cancellation and may include other suitable processing elements in other aspects. Components of the baseband circuitry may be suitably combined in a single chip, a single chipset, or disposed on a same circuit board in some aspects. In some aspects, some or all of the constituent components of the baseband circuitry 204 and the application circuitry 202 may be implemented together such as, for example, on a system on a chip (SOC).

In some aspects, the baseband circuitry 204 may provide for communication compatible with one or more radio technologies. For example, in some aspects, the baseband circuitry 204 may support communication with an evolved universal terrestrial radio access network (EUTRAN) or other wireless metropolitan area networks (WMAN), a wireless local area network (WLAN), a wireless personal area network (WPAN). Aspects in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various aspects, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some aspects, the receive signal path of the RF circuitry 206 may include mixer circuitry 206A, amplifier circuitry 206B and filter circuitry 206C. In some aspects, the transmit signal path of the RF circuitry 206 may include filter circuitry 206C and mixer circuitry 206A. RF circuitry 206 may also include synthesizer circuitry 206D for synthesizing a frequency for use by the mixer circuitry 206A of the receive signal path and the transmit signal path. In some aspects, the mixer circuitry 206A of the receive signal path may be configured to down-convert RF signals received from the FEM circuitry 208 based on the synthesized frequency provided by synthesizer circuitry 206D. The amplifier circuitry 206B may be configured to amplify the down-converted signals and the filter circuitry 206C may be a low-pass filter (LPF) or band-pass filter (BPF) configured to remove unwanted signals from the down-converted signals to generate output baseband signals. Output baseband signals may be provided to the baseband circuitry 204 for further processing. In some aspects, the output baseband signals may be zero-frequency baseband signals, although this is not a requirement. In some aspects, mixer circuitry 206A of the receive signal path may comprise passive mixers, although the scope of the aspects is not limited in this respect.

In some aspects, the mixer circuitry 206A of the transmit signal path may be configured to up-convert input baseband signals based on the synthesized frequency provided by the synthesizer circuitry 206D to generate RF output signals for the FEM circuitry 208. The baseband signals may be provided by the baseband circuitry 204 and may be filtered by filter circuitry 206C.

In some aspects, the mixer circuitry 206A of the receive signal path and the mixer circuitry 206A of the transmit signal path may include two or more mixers and may be arranged for quadrature downconversion and upconversion, respectively. In some aspects, the mixer circuitry 206A of the receive signal path and the mixer circuitry 206A of the transmit signal path may include two or more mixers and may be arranged for image rejection (e.g., Hartley image rejection). In some aspects, the mixer circuitry 206A of the receive signal path and the mixer circuitry 206A may be arranged for direct downconversion and direct upconversion, respectively. In some aspects, the mixer circuitry 206A of the receive signal path and the mixer circuitry 206A of the transmit signal path may be configured for super-heterodyne operation.

In some aspects, the output baseband signals and the input baseband signals may be analog baseband signals, although the scope of the aspects is not limited in this respect. In some alternate aspects, the output baseband signals and the input baseband signals may be digital baseband signals. In these alternate aspects, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode aspects, a separate radio IC circuitry may be provided for processing signals for each spectrum, although the scope of the aspects is not limited in this respect.

In some aspects, the synthesizer circuitry 206D may be a fractional-N synthesizer or a fractional N/N+1 synthesizer, although the scope of the aspects is not limited in this respect as other types of frequency synthesizers may be suitable. For example, synthesizer circuitry 206D may be a delta-sigma synthesizer, a frequency multiplier, or a synthesizer comprising a phase-locked loop with a frequency divider.

The synthesizer circuitry 206D may be configured to synthesize an output frequency for use by the mixer circuitry 206A of the RF circuitry 206 based on a frequency input and a divider control input. In some aspects, the synthesizer circuitry 206D may be a fractional N/N+1 synthesizer.

In some aspects, frequency input may be provided by a voltage controlled oscillator (VCO), although that is not a requirement. Divider control input may be provided by either the baseband circuitry 204 or the applications processor 202 depending on the desired output frequency. In some aspects, a divider control input (e.g., N) may be determined from a look-up table based on a channel indicated by the applications processor 202.

Synthesizer circuitry 206D of the RF circuitry 206 may include a divider, a delay-locked loop (DLL), a multiplexer and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump and a D-type flip-flop. In these aspects, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some aspects, synthesizer circuitry 206D may be configured to generate a carrier frequency as the output frequency, while in other aspects, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some aspects, the output frequency may be a LO frequency (fLO). In some aspects, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various aspects, the amplification through the transmit signal paths or the receive signal paths may be done solely in the RF circuitry 206, solely in the FEM 208, or in both the RF circuitry 206 and the FEM 208.

In some aspects, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some aspects, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other aspects, the PMC 212 may be additionally or alternatively coupled with, and perform similar power management operations for, other components such as, but not limited to, application circuitry 202, RF circuitry 206, or FEM 208.

In some aspects, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX) after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may transition back to RRC_Connected state in order to receive data.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
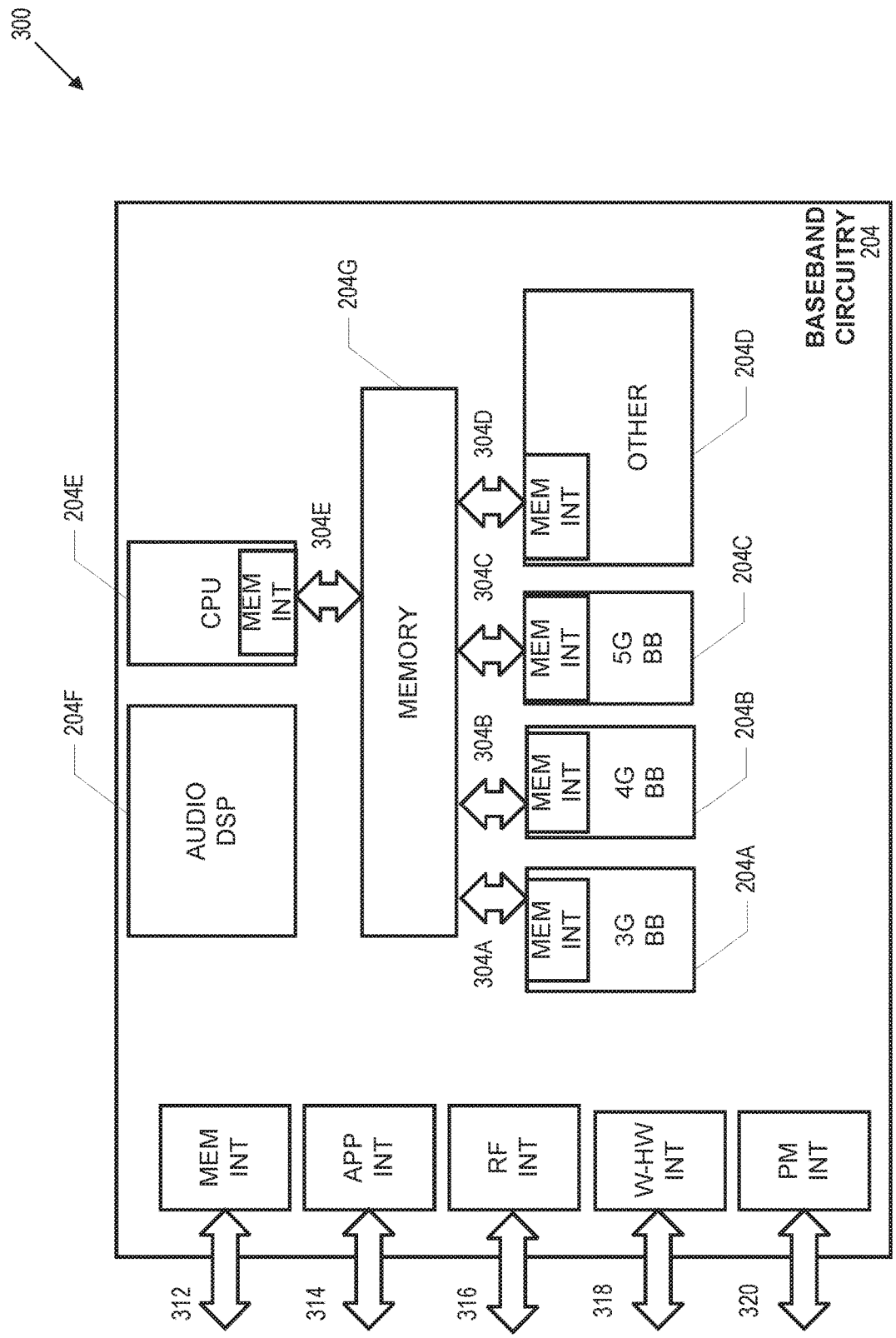
FIG. 3 illustrates example interfaces of baseband circuitry in accordance with some aspects.

FIG. 3 illustrates example interfaces of baseband circuitry in accordance with some aspects. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
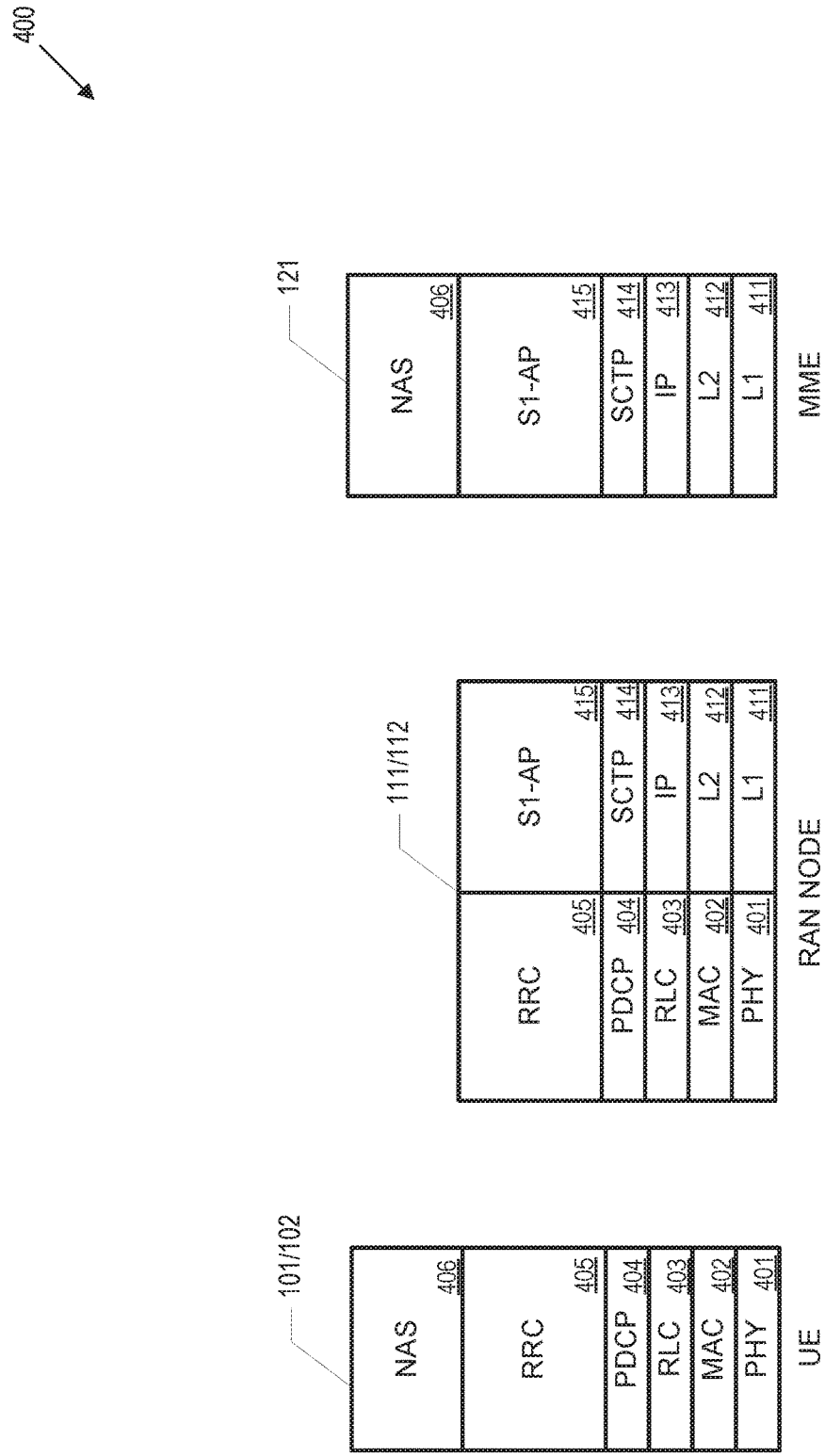
FIG. 4 is an illustration of a control plane protocol stack in accordance with some aspects.

FIG. 4 is an illustration of a control plane protocol stack in accordance with some aspects. In this aspect, a control plane 400 is shown as a communications protocol stack between the UE 101 (or alternatively, the UE 102), the RAN node 111 (or alternatively, the RAN node 112), and the MME 121.

The PHY layer 401 may transmit or receive information used by the MAC layer 402 over one or more air interfaces. The PHY layer 401 may further perform link adaptation or adaptive modulation and coding (AMC), power control, cell search (e.g., for initial synchronization and handover purposes), and other measurements used by higher layers, such as the RRC layer 405. The PHY layer 401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARQ), and logical channel prioritization.

The RLC layer 403 may operate in a plurality of modes of operation, including: Transparent Mode (TM), Unacknowledged Mode (UM), and Acknowledged Mode (AM). The RLC layer 403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 101 and the RAN node 111 may utilize a Uu interface (e.g., an LTE-Uu interface) to exchange control plane data via a protocol stack comprising the PHY layer 401, the MAC layer 402, the RLC layer 403, the PDCP layer 404, and the RRC layer 405.

The non-access stratum (NAS) protocols 406 form the highest stratum of the control plane between the UE 101 and the MME 121. The NAS protocols 406 support the mobility of the UE 101 and the session management procedures to establish and maintain IP connectivity between the UE 101 and the P-GW 123.

The S1 Application Protocol (S1-AP) layer 415 may support the functions of the S1 interface and comprise Elementary Procedures (EPs). An EP is a unit of interaction between the RAN node 111 and the CN 120. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 414 may ensure reliable delivery of signaling messages between the RAN node 111 and the MME 121 based, in part, on the IP protocol, supported by the IP layer 413. The L2 layer 412 and the L1 layer 411 may refer to communication links (e.g., wired or wireless) used by the RAN node and the MME to exchange information.

The RAN node 111 and the MME 121 may utilize an S1-MME interface to exchange control plane data via a protocol stack comprising the L1 layer 411, the L2 layer 412, the IP layer 413, the SCTP layer 414, and the S1-AP layer 415.

Figure 5:
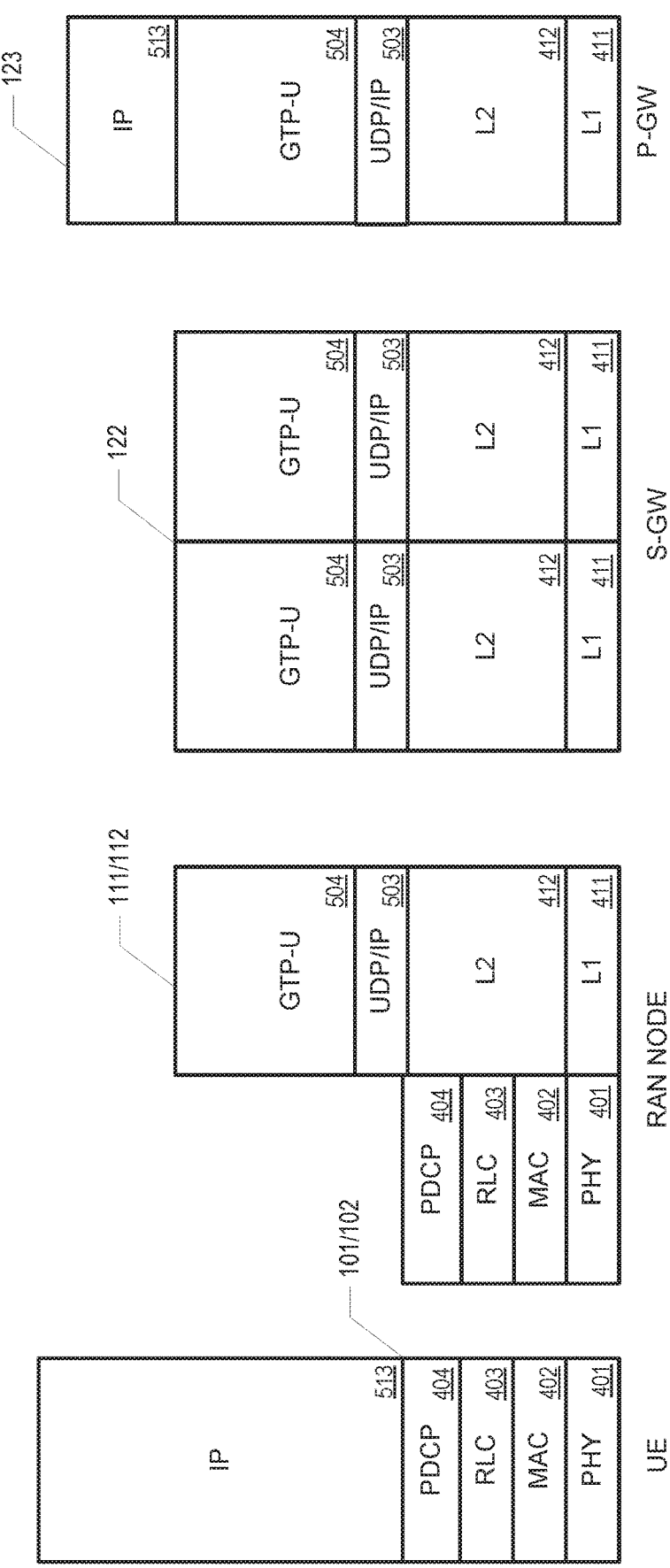
FIG. 5 is an illustration of a user plane protocol stack in accordance with some aspects.

FIG. 5 is an illustration of a user plane protocol stack in accordance with some aspects. In this aspect, a user plane 500 is shown as a communications protocol stack between the UE 101 (or alternatively, the UE 102), the RAN node 111 (or alternatively, the RAN node 112), the S-GW 122, and the P-GW 123. The user plane 500 may utilize at least some of the same protocol layers as the control plane 400. For example, the UE 101 and the RAN node 111 may utilize a Uu interface (e.g., an LTE-Uu interface) to exchange user plane data via a protocol stack comprising the PHY layer 401, the MAC layer 402, the RLC layer 403, and the PDCP layer 404.

The General Packet Radio Service (GPRS) Tunneling Protocol for the user plane (GTP-U) layer 504 may be used for carrying user data within the GPRS core network and between the radio access network and the core network. The user data transported can be packets in any of IPv4, IPv6, or PPP formats, for example. The UDP and IP security (UDP/IP) layer 503 may provide checksums for data integrity, port numbers for addressing different functions at the source and destination, and encryption and authentication on the selected data flows. The RAN node 111 and the S-GW 122 may utilize an S1-U interface to exchange user plane data via a protocol stack comprising the L1 layer 411, the L2 layer 412, the UDP/IP layer 503, and the GTP-U layer 504. The S-GW 122 and the P-GW 123 may utilize an S5/S8a interface to exchange user plane data via a protocol stack comprising the L1 layer 411, the L2 layer 412, the UDP/IP layer 503, and the GTP-U layer 504. As discussed above with respect to FIG. 4, NAS protocols support the mobility of the UE 101 and the session management procedures to establish and maintain IP connectivity between the UE 101 and the P-GW 123.

Figure 6:
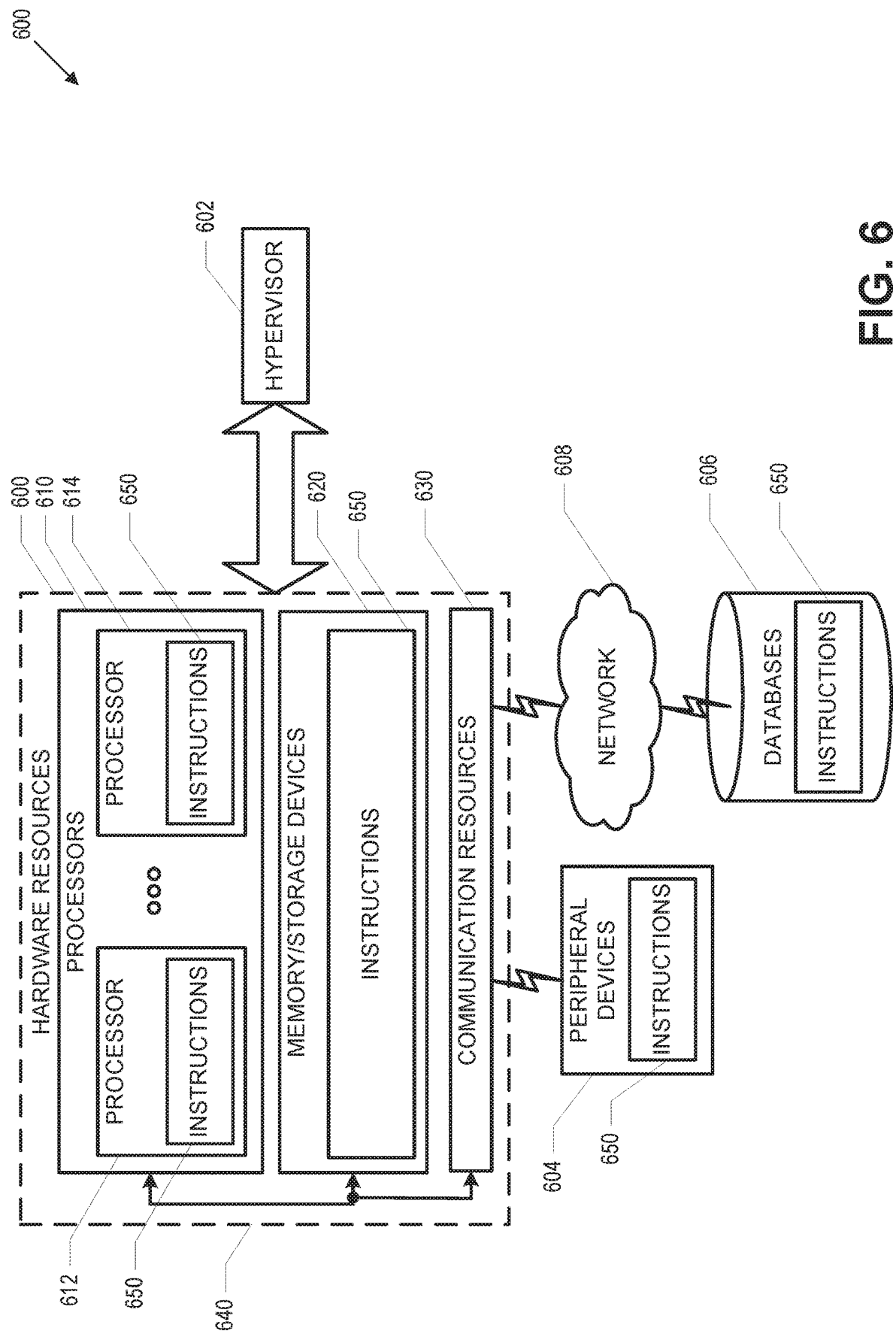
FIG. 6 is a block diagram illustrating components, according to some example aspects, able to read instructions from a machine-readable or computer-readable medium (e.g., a non-transitory machine-readable storage medium) and perform any one or more of the methodologies discussed herein.

FIG. 6 is a block diagram illustrating components, according to some example aspects, able to read instructions from a machine-readable or computer-readable medium (e.g., a non-transitory machine-readable storage medium) and perform any one or more of the methodologies discussed herein. Specifically, FIG. 6 shows a diagrammatic representation of hardware resources 600 including one or more processors (or processor cores) 610, one or more memory/storage devices 620, and one or more communication resources 630, each of which may be communicatively coupled via a bus 640. For aspects where node virtualization (e.g., NFV) is utilized, a hypervisor 602 may be executed to provide an execution environment for one or more network slices/sub-slices to utilize the hardware resources 600

The processors 610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 612 and a processor 614.

The memory/storage devices 620 may include main memory, disk storage, or any suitable combination thereof. The memory/storage devices 620 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 630 may include interconnection or network interface components or other suitable devices to communicate with one or more peripheral devices 604 or one or more databases 606 via a network 608. For example, the communication resources 630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
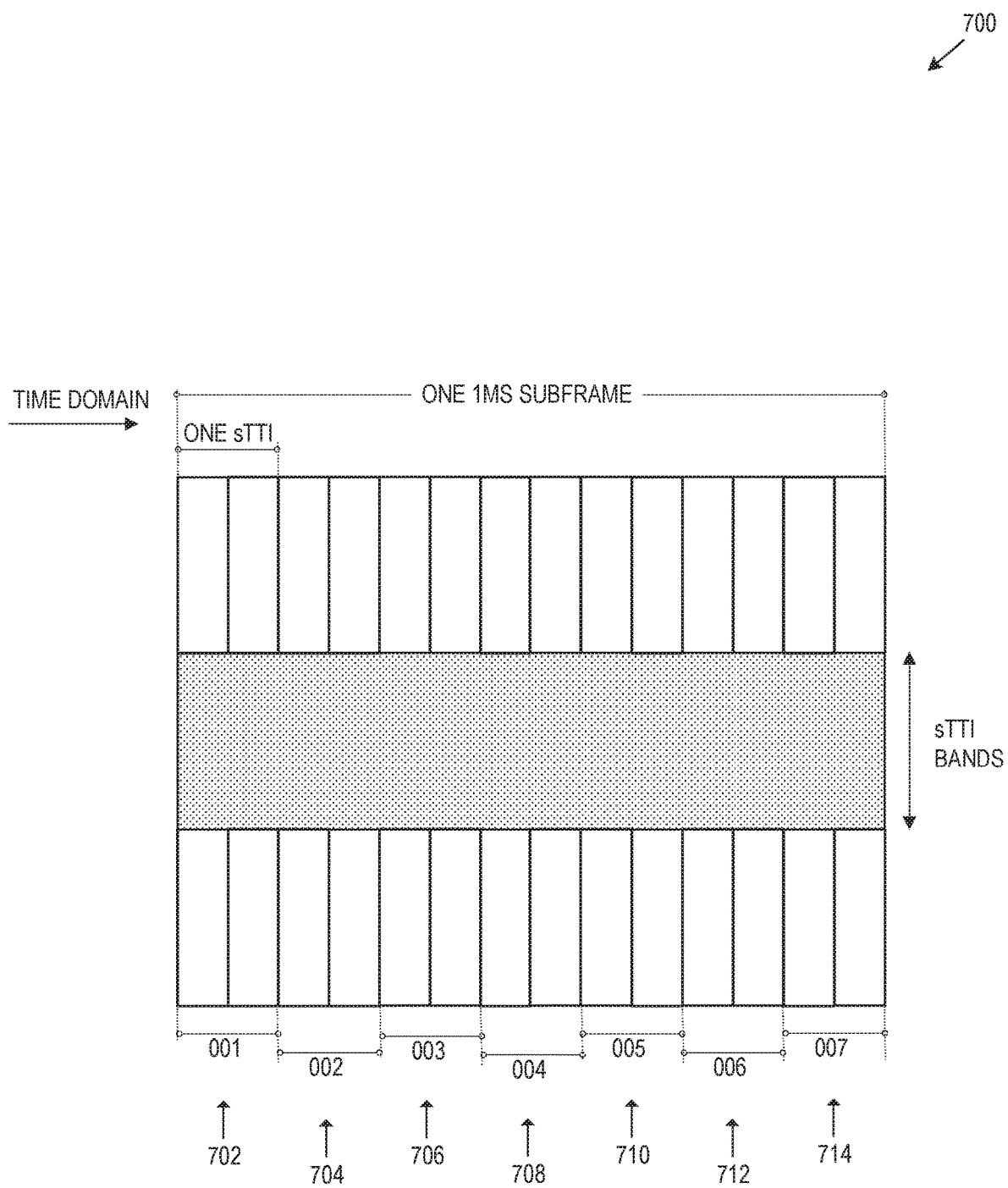
FIG. 7 illustrates an example frame structure with support for shorter transmission time interval (S-TTI) operations in accordance with some aspects.

FIG. 7 illustrates an example frame structure with support for shorter transmission time interval (S-TTI) operations in accordance with some aspects. Referring to FIG. 7, there is illustrated an example data structure (e.g., a subframe) 700 supporting S-TTI transmissions. More specifically, the data structure 700 can be a subframe occupying a 1 ms time window (i.e., a 1 ms TTI). In some aspects, a data structure 700 occupying a single TTI can be subdivided into multiple shorter TTI's (S-TTI's). As seen in FIG. 7, the 1 ms subframe 700 can be divided into S-TTI's 702, 704, 706, 708, 710, 712, and 714. In some aspects, control and data channels can be transmitted in each of the S-TTI's, including uplink (UL) and downlink (DL) scheduling assignments.

In some aspects, the information transmitted within the S-TTI's of a given time window can be UE-specific or cell-specific. For example, scheduling assignments for a single UE (or multiple UEs within a given cell) can be transmitted in multiple S-TTI's (or within a single S-TTI) within a time window (e.g., the TTI of subframe 700).

As used herein, a physical downlink control channel (PDCCH), a physical downlink shared channel (PDSCH), and a physical uplink shared channel (PUSCH) transmitted in an S-TTI are referred to S-PDCCH, S-PDCCH and S-PUSCH, respectively. As one example depicted in FIG. 7, the available 14 DL symbols in subframe 700 may be partitioned into 7 equally-sized S-TTIs 001 to 007 (or 702-714) with two symbols in each S-TTI.

In some aspects, in order to fulfill backward compatibility requirements, the PDCCH may be transmitted within the first several symbols for scheduling PDSCHs for legacy UEs. More than one S-PDSCHs may be transmitted in an S-TTI for different UEs. Additionally, a single UE (e.g., UE 101 or 102) may be scheduled more than one time within a time window, such as a traditional 1 ms subframe period.

Referring to FIG. 7, one challenge related to S-PDCCH monitoring within S-TTI's is that a shortening TTI technique providing reduced latency may result in increase of processing load (e.g., preforming blind decoding attempts (BDAs) within a given period, such as a 1 ms legacy subframe, due to a reduced S-TTI length). As one example, the number of BDAs for S-TTI operation can increase up to seven times compared to legacy LTE. In some aspects, various techniques described herein can be used to timely inform a UE to discontinue sPDCCH monitoring (e.g., in instances when an eNB decides not to schedule S-TTI within a given subframe for some UEs in order to save power). In some aspects, one or more of the following techniques can be used to efficiently operate S-TTI functionalities: time-window-based discontinuous reception (DRX) operations to minimize the power consumptions at the UE due to unnecessary blind decoding of sPDCCH; group-specific DCI format design to operate time window based DRX operation and UE-specific DCI format design; and fall back operation in case of lack of a DCI format with DRX indicators. Further information regarding these techniques related to S-TTI operations are discussed herein below.

In accordance with one or more aspects, a DRX indicator can be provided to indicate discontinuous reception of a shorter transmission time interval within a predefined time window. In addition, a release indictor may be used to release an S-TTI configuration that was previously assigned to an UE (e.g., via a DCI format). The DRX indicator and the S-TTI configuration release indicator may be transmitted within a common control channel (e.g., DCI transmitted on a downlink control channel).

Figure 8:
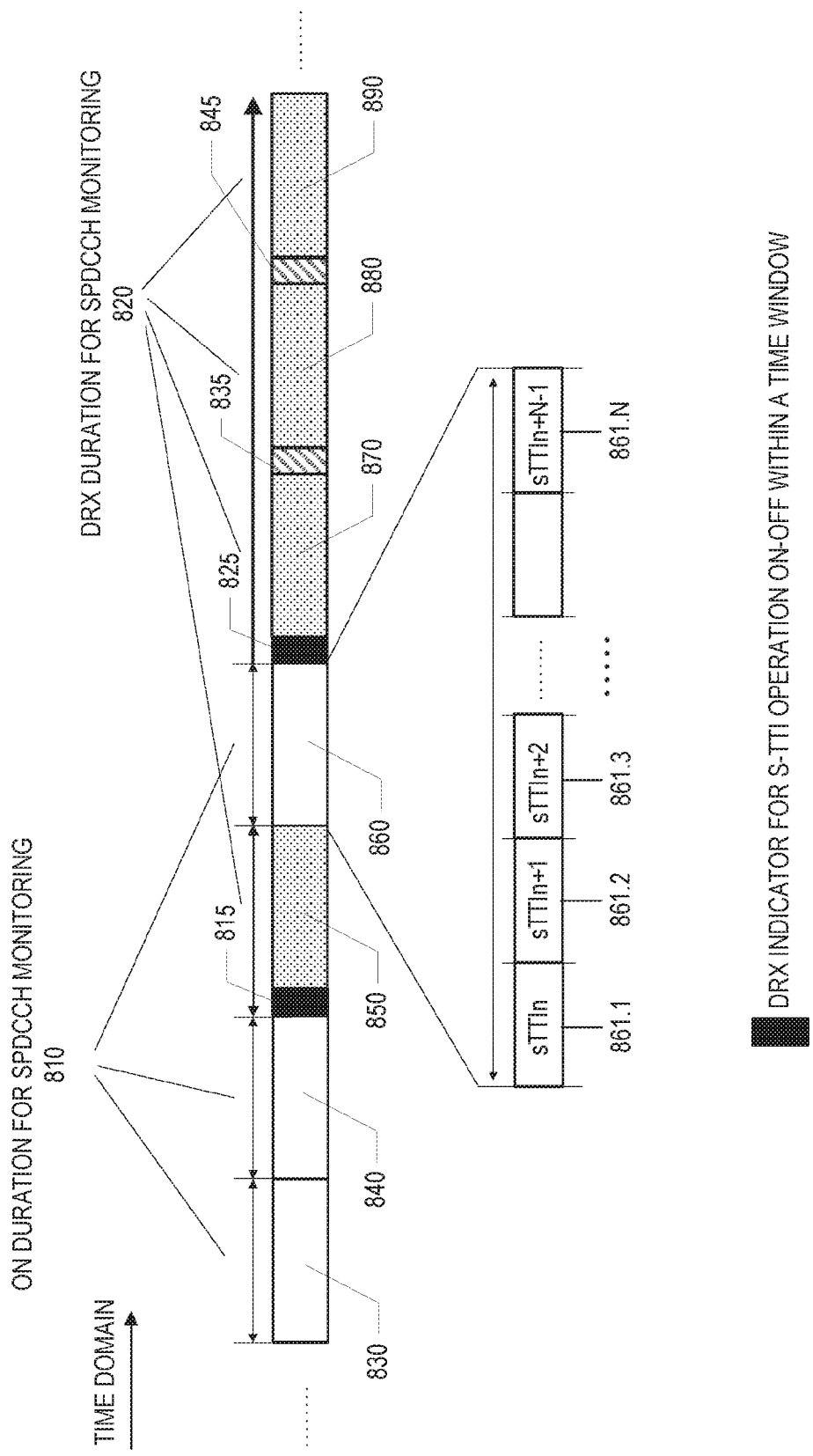
FIG. 8 illustrates an example time window-based S-TTI operation in accordance with some aspects.

FIG. 8 illustrates an example time window-based S-TTI operation in accordance with some aspects. Referring to FIG. 8, there is illustrated a plurality of time windows 830, 840, 850, 860, 870, 880, and 890 which can be used in connection with S-TTI monitoring. Each of the time windows 830-890 can be partitioned into a plurality of S-TTI's, with the control information (e.g., uplink and downlink assignments) being transmitted within each of the S-TTI's so that one or more UEs can monitor each of the S-TTI's and can be scheduled multiple times within the duration of the time window.

At time window, such as time window 860, can include N S-TTI's, 861.1-861.N. In an aspect, the number of S-TTI's within a time window can be configured by the eNB via a higher layer signaling, and can be changed dynamically based on, e.g., UE signal quality metrics, UE location, UE moving speed, and so forth.

In an aspect, the time window may be fixed to be equal to one subframe in an LTE communication system (i.e., 1 ms total duration). Alternatively, the time window duration may be semi-statically configurable in UE-specific manner by higher layers (e.g., based on UE feedback on signal quality measurements, UE location, UE moving speed, and so forth).

In some aspects, a UE can be configured for S-TTI operations using higher layer signaling (e.g., 191). Once a UE has been configured for S-TTI operations, the UE can monitor the sPDCCH within each S-TTI in order to determine PDCCH assignments (e.g., uplink and downlink assignments). In instances when the UE detects a DRX indicator (e.g. within a DCI communicated via a sPDCCH), the UE can discontinue S-TTI operations and S-TTI monitoring for the duration of the time window (or for the duration of one or more subsequent time windows), and can treat the time window as a conventional time window with a single TTI.

As seen in FIG. 8, a DRX indicator 815 and 825 are transmitted at the beginning of time windows 850 and 870 respectively, and no DRX indicator being transmitted within time windows 830, 840, and 860. In some aspects, once a UE is configured with S-TTI operations (e.g., by higher layer signaling), the UE shall apply S-TTI operations (e.g. sPDCCH monitoring to determine PDCCH assignment in each of a plurality of S-TTIs) within each time window 830, 840 and 860, unless a DRX indictor is detected for a respective time window. In this regard, since no DRX indicator is detected within time windows 830, 840, and 860, sPDCCH monitoring 810 can be performed within each S-TTI within these time windows.

In some aspects, the frequency bands location of sPDCCH (if present in an S-TTI of a time window 160) may be either configured by RRC signaling or by dynamically indicated through a PDCCH channel. In instances when a DRX indicator (e.g., 815 and 825) is detected, the UE can be configured to discontinue S-TTI operations during the corresponding associated time window (or windows). For example, DRX indicator 825 can be configured to indicate discontinuation of S-TTI operations not only during time window 870, but also during time windows 880 and 890. In this regard, FIG. 8 indicates opportunistic (or optional) DRX indicators 835 and 845 four corresponding time windows 880 and 890. In instances when DRX indicator 825 is associated with multiple time windows, such as 870, 880, and 890, such DRX indicator detected in time window 870 is used to indicate discontinuation of S-TTI operations within the associated time windows 870, 880, and 890. In some aspects, a DL control channel (e.g., a PDCCH) or a MAC Control Element (MAC CE) can be used to convey the DRX indictor.

In some aspects, the time window duration may be dynamically configured by PDCCH as part of DCI format that is used for communicating the DRX indictor. For example, the DRX indictor in time window 870 may include a single-bit and/or multi-bit DRX duration field (as discussed below in reference to FIG. 9) to indicate the length of DRX for S-TTI operation (e.g. the sPDCCH monitoring) in the time window 870 only and/or one or more subsequent time windows such as time windows 880 and 890 to avoid DRX indictor transmissions in the subsequent time windows. Furthermore, the UE can alter the S-TTI operations employed for subsequent time window based upon the DRX indictors when received.

Figure 9:
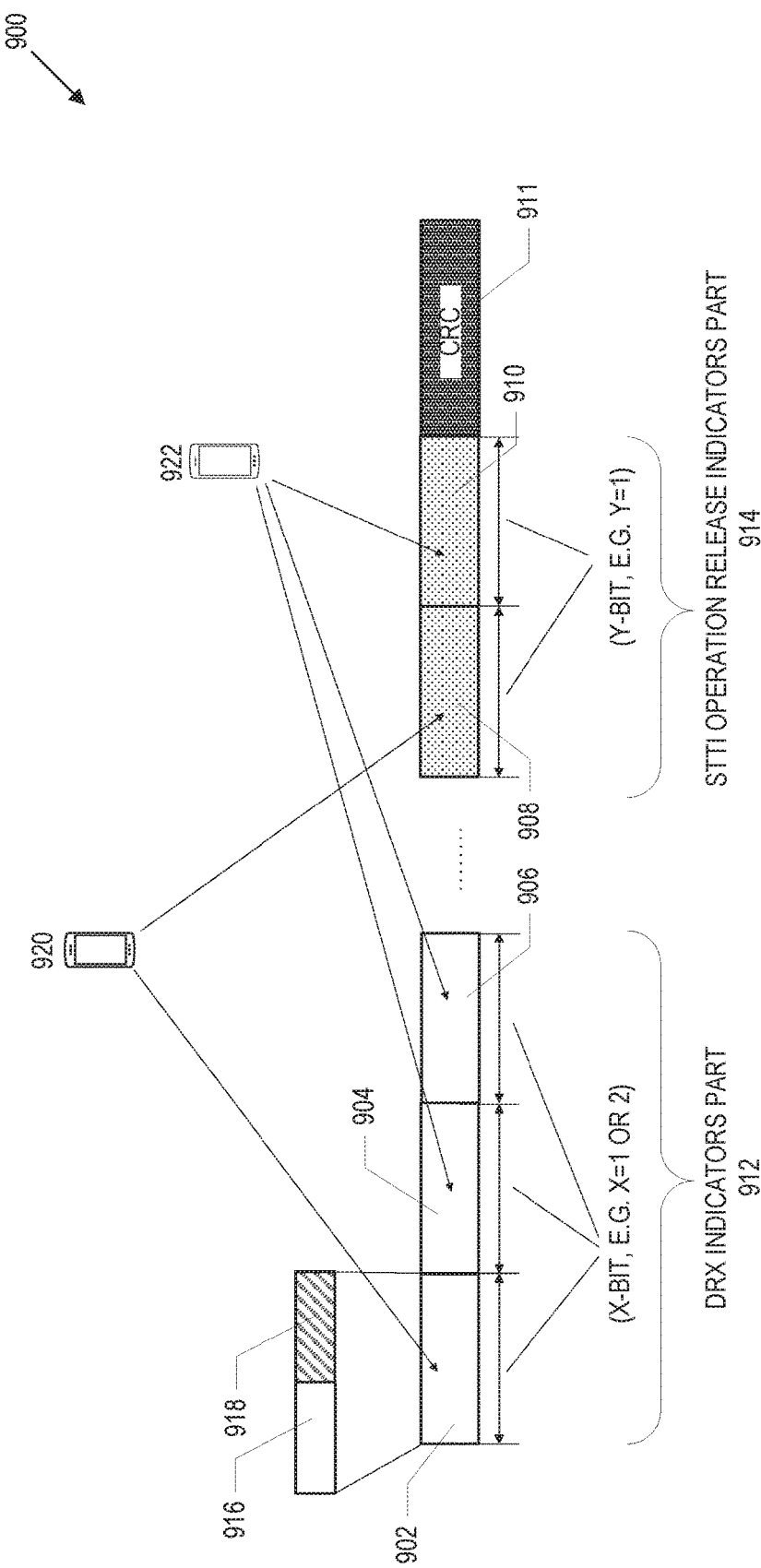
FIG. 9 illustrates an example downlink control information (DCI) format for S-TTI operation in accordance with some aspects.

FIG. 9 illustrates an example downlink control information (DCI) format for S-TTI operation in accordance with some aspects. Referring to FIG. 9, the example DCI format 900 can be used for coordinating S-TTI operations including transition to DRX mode for a group of UEs in a wireless communication environment.

The DCI format 900 can include DRX indicators portion 912 and S-TTI operation release indicators portion 914 within a common DCI format (which can also include a cyclic redundancy check portion 911). According to certain aspects and as depicted in FIG. 9, the DCI format 900 can includes both a DRX indicator (e.g., 902, 904, and 906) and an S-TTI release indicator (e.g., 908 and 910) for a single UE or different UEs (e.g., 920 and 922). In some aspects, an eNB can transmit a single DCI format 900 to convey both a DRX indictor as well as an S-TTI operation release indicator to a group of UEs or to a single UE for the intended DRX S-TTI operations. The DCI format structure in FIG. 9 can be used for reducing overhead by grouping DRX indictors and/or S-TTI release indictors for multiple UEs into each PDCCH transmission.

In some aspects, the DCI format 900 may have a same size as a legacy DCI format, e.g. DCI format 1C or 1A scrambled with a DRX-specific Radio Network Temporary Identifier (RNTI) in a common search space (CSS) or UE-group-specific search space.

In some aspects, a DRX indicator field (e.g., 902) can include a DRX operation flag 916 and a time duration field 918. The DRX operation flag 916 can be a 1-bit or a 2-bit flag. The DRX operation flag 916 can be set to a pre-defined value (e.g. "1") to indicate that the UE or the serving cell (SCell) associated with the DRX index can be deactivated for both DL and UL S-TTI operations. In some aspects, a separate DRX operation for DL and UL S-TTI can be achieved by increasing this flag field to 2 bits. In this case, a UE can be configured to only monitor UL grants in corresponding sPDCCH in every S-TTI when DL S-TTI is indicated as DRX (i.e., no S-TTI monitoring) for a given time window.

In some aspects, the time duration field 918 can be used to indicate the time period, during which the UE does not perform S-TTI operations, such as monitoring the sPDCCH. As one example, a 2-bit time duration field 918 can be used to indicate one of four lengths (e.g., 1, 2, 4, or 8) time windows. In some aspects, the indicated time windows can be consecutive or nonconsecutive.

In some aspects, one DCI format 900 may carry one or more X-bit DRX indictors and one Y-bit S-TTI release indictor to a given UE. The S-TTI operation release indicators, such as 908 and 910, can be used to indicate to a specific UE or UEs associated with a SCell to deactivate S-TTI monitoring. For example, S-TTI monitoring can be activated by higher layer signaling for a given UE or UEs within a SCell. An eNB can subsequently deactivate the S-TTI monitoring using an S-TTI operation release indicator (e.g., 908 and 910) within a DCI format 900.

In some aspects, the length of each DRX indictor and S-TTI release indictor may be different. For example, a 3-bit DRX indicator can be used to indicate the DRX operation including both on-off and duration configurations (i.e DRX operation flag 916 and time duration field 918 can include a total of three bits). A 1-bit S-TTI operation release indicator (e.g., 908 and 910) may be sufficient for tuning on-off S-TTI operations. Hence, in some designs, when the UE receives DCI format 900, the UE may determine different portions of the DCI format payload correspond to indicators of DRX and S-TTI release. In one aspect, the UE may determine that, in the payload of DCI format 900, the first several bits (e.g. the first M bits) are used for DRX indictors and the remaining bits are used for S-TTI release indictors. In some aspects, the value of M may be explicitly provided by RRC messaging.

In some aspects, a parameter DRX-index and/or S-TTI-release-index can be provided by higher layers and can be used to determine the index to the DRX indictors and S-TTI release indictors for a given UE. For example, a UE 920 can be configured with one component carrier (CC) for S-TTI operation. Correspondingly, one DRX-index (to DRX indicator 202) and one S-TTI-release-index (to S-TTI operation release indicator 208) may be configured for this UE. Another UE 922 may be configured with multiple CCs for S-TTI operations simultaneously, where each of the CCs belongs to a different band. In this case, the different CCs for the UE 922 can be grouped into a single or different groups associated with one or multiple DRX radio network temporary identifier (RNTI). In particular, each CC of UE 922 can be assigned with one respective DRX-index (e.g., to X-bit DRX indicators 904 and 906) together with a single S-TTI-release-index (e.g., to Y-bit S-TTI operation release indicator 910) to support CC-specific S-TTI DRX operations. In some designs, one or more group RNTIs may be allocated to a UE through higher layer signaling. In some aspects, a group RNTI can be common to all UEs in a group for S-TTI on-off operations.

In some aspects, a legacy DCI format may be used for communicating DRX indictors and S-TTI operation release indicators. The UE can be configured to validate the DCI format in instances when one or more predefined conditions are met. In some aspects, the following conditions may be included for purposes of validating the DCI format as control information carrying DRX indicators and S-TTI release indicators. The CRC parity bits obtained for the PDCCH payload can be scrambled with the DRX C-RNTI; and/or the following specific fields are set for DRX DL S-TTI operations—HARQ process number field set to "000"; the MSB of modulation and coding scheme field set to "0"; the redundancy version field is set to "00"; and/or the following specific fields are set for DRX UL S-TTI operations—TPC command for scheduled PUSCH field set to "000"; the Cyclic shift DMRS field set to "0"; and the MSB of modulation and coding scheme and redundancy version field is set to "0". In some aspects, the DCI format can be transmitted in UE-specific search spaces for a given UE.

Figure 10:
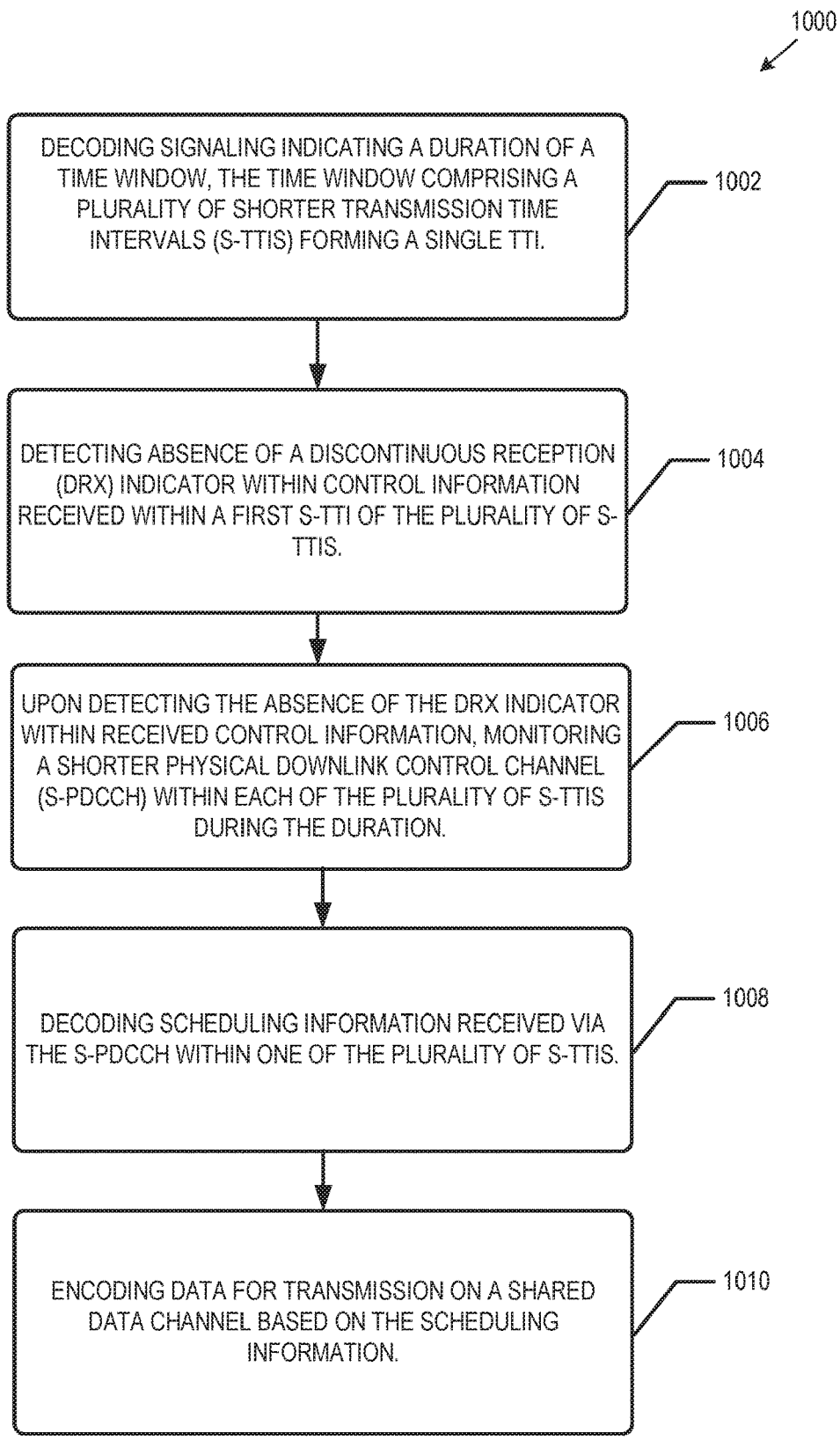
FIG. 10, FIG. 11 and FIG. 12 are flow diagrams illustrating example functionalities for performing S-TTI operations in accordance with some aspects.
Figure 11:
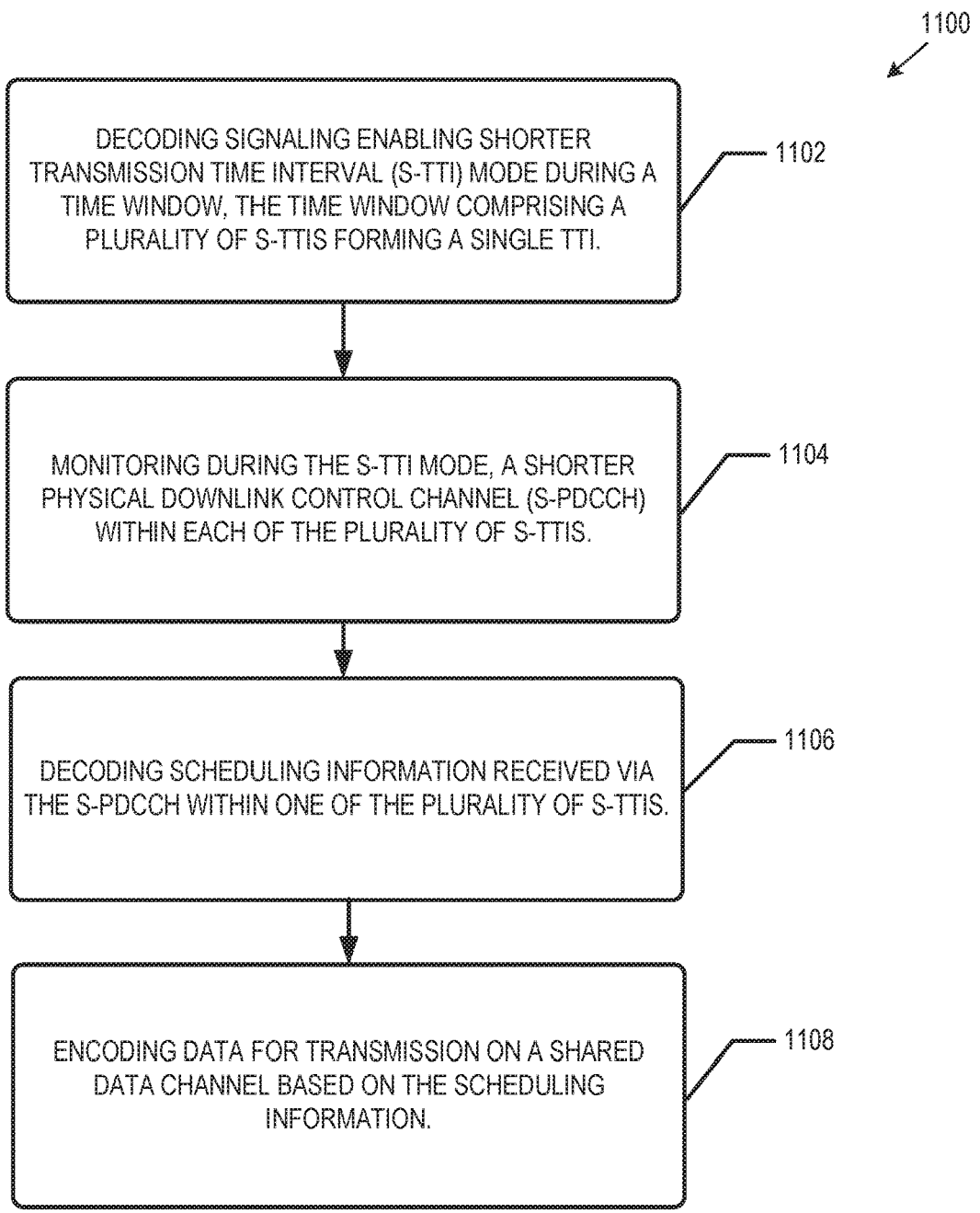
Figure 12:
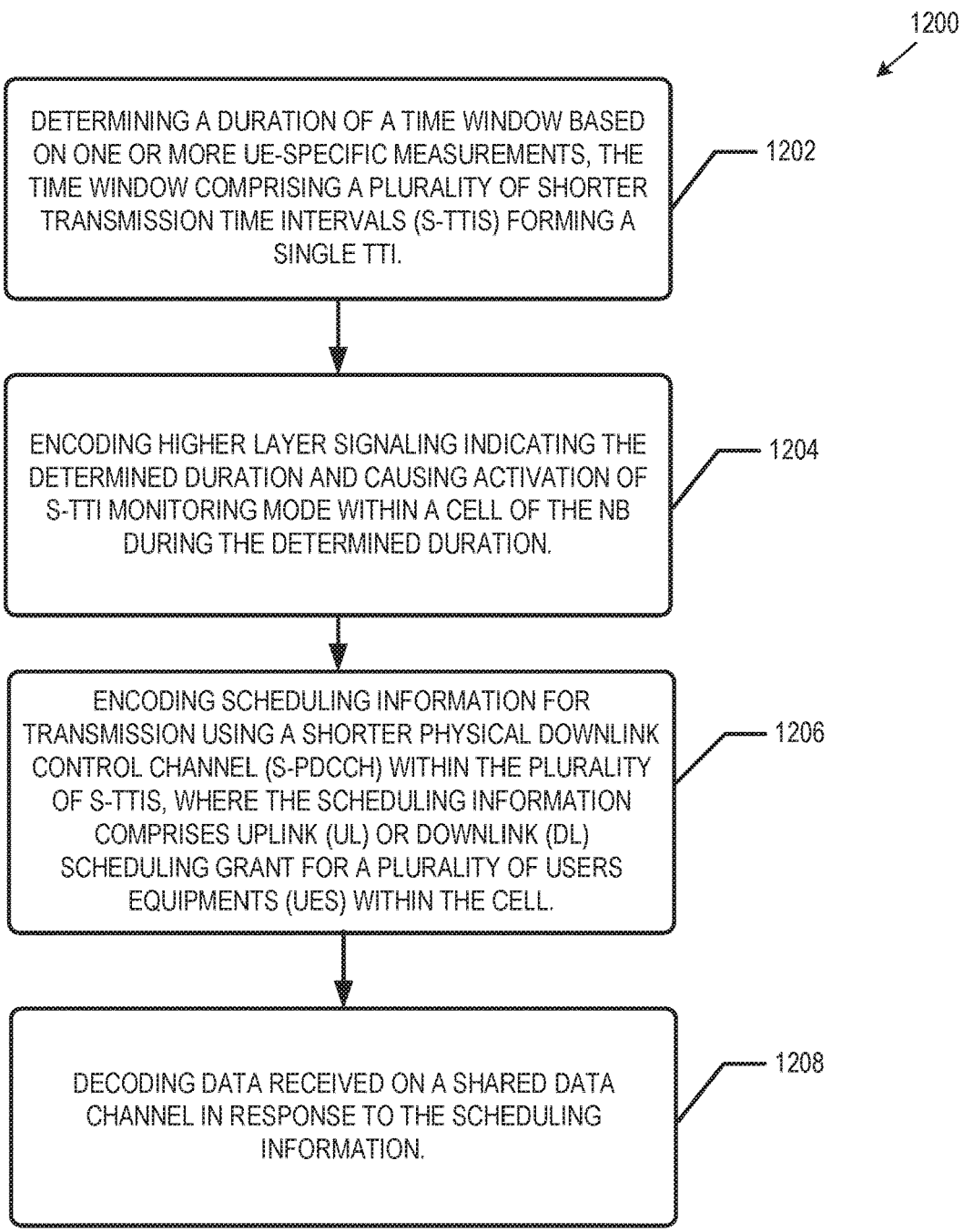

FIG. 10, FIG. 11 and FIG. 12 are flow diagrams illustrating example functionalities for performing S-TTI operations in accordance with some aspects. Referring to FIG. 10, the example method 1000 can start at 1002, when signaling indicating a duration of a time window can be decoded. For example, UE 101 can receive higher layer signaling 191 from the eNB 111, where the higher layer signaling can indicate a duration of the time window (e.g. a subframe). The time window (e.g., 700) can include a plurality of shorter transmission time intervals (S-TTIs) (e.g., 702-714) forming a single TTI. At 1004, absence of a discontinuous reception (DRX) indicator can be detected within control information received within a first S-TTI of the plurality of S-TTIs. For example and in reference to FIG. 8, a UE can receive control information transmissions within time window 830 without receiving a DRX indicator. At 1006, upon detecting the absence of the DRX indicator within the received control information, a shorter physical downlink control channel (S-PDCCH) can be monitored within each of the plurality of S-TTIs during the duration. For example, since the receiving UE has not detected a DRX indicator at the beginning of time window 830, the UE can perform control channel monitoring within each S-TTI within the time window 830. At 1008, scheduling information received via the S-PDCCH within one of the plurality of S-TTIs can be decoded. At 1010, data can be encoded for transmission on a shared data channel based on the scheduling information. For example, the UE can receive a control channel information within one or more of the S-TTI's within time window 830, and can obtain uplink and downlink scheduling grants via the control information. Subsequent data transmission on an uplink shared channel can be initiated based on the received uplink scheduling grant.

Referring to FIG. 11, the example method 1100 can start at 1102, when signaling (e.g., a higher layer signaling 191) enabling shorter transmission time interval (S-TTI) mode during a time window can be decoded. The time window can include a plurality of S-TTIs forming a single TTI. In some aspects, the UEs with enabled S-TTI mode are configured to monitor sPDCCH transmissions within each S-TTI of a time window, until such continuous S-TTI monitoring is deactivated by an S-TTI operation release indicator or delayed based on a DRX indicator. At 1104, a shorter physical downlink control channel (S-PDCCH) within each of the plurality of S-TTIs can be monitored during the S-TTI mode. At 1106, scheduling information (e.g., an uplink grant or downlink grant information) received via the S-PDCCH within one of the plurality of S-TTIs can be decoded. At 1108, data can be encoded for transmission on a shared data channel based on the scheduling information.

Referring to FIG. 12, the example method 1200 can start at 1202, when a duration of a time window can be determined based on one or more UE-specific measurements. For example, the eNB 111 can receive UE information 190 and can determine the duration of the time window based on the UE information 190. The time window can include a plurality of shorter transmission time intervals (S-TTIs) forming a single TTI. The UE information 190 can include various UE measurements (e.g. UE signal quality measurements), UE location, UE moving speed, and so forth. At 1204, higher layer signaling (e.g., 191) indicating the determined duration and causing activation of S-TTI monitoring mode within a cell of the NB during the determined duration can be encoded for transmission. At 1206, scheduling information can be encoded for transmission using a shorter physical downlink control channel (S-PDCCH) within the plurality of S-TTIs. The scheduling information can include uplink (UL) or downlink (DL) scheduling grant for a plurality of users equipments (UEs) within the cell. For example and as seen in reference to FIG. 9, the DCI format 900 can include DRX indicators and S-TTI operation release indicators for multiple UEs, which can determine when to monitor the downlink control channel for scheduling assignments based on the information within the DCI format 900. At 1208, data received on a shared data channel in response to the scheduling information can be decoded.

Figure 13:
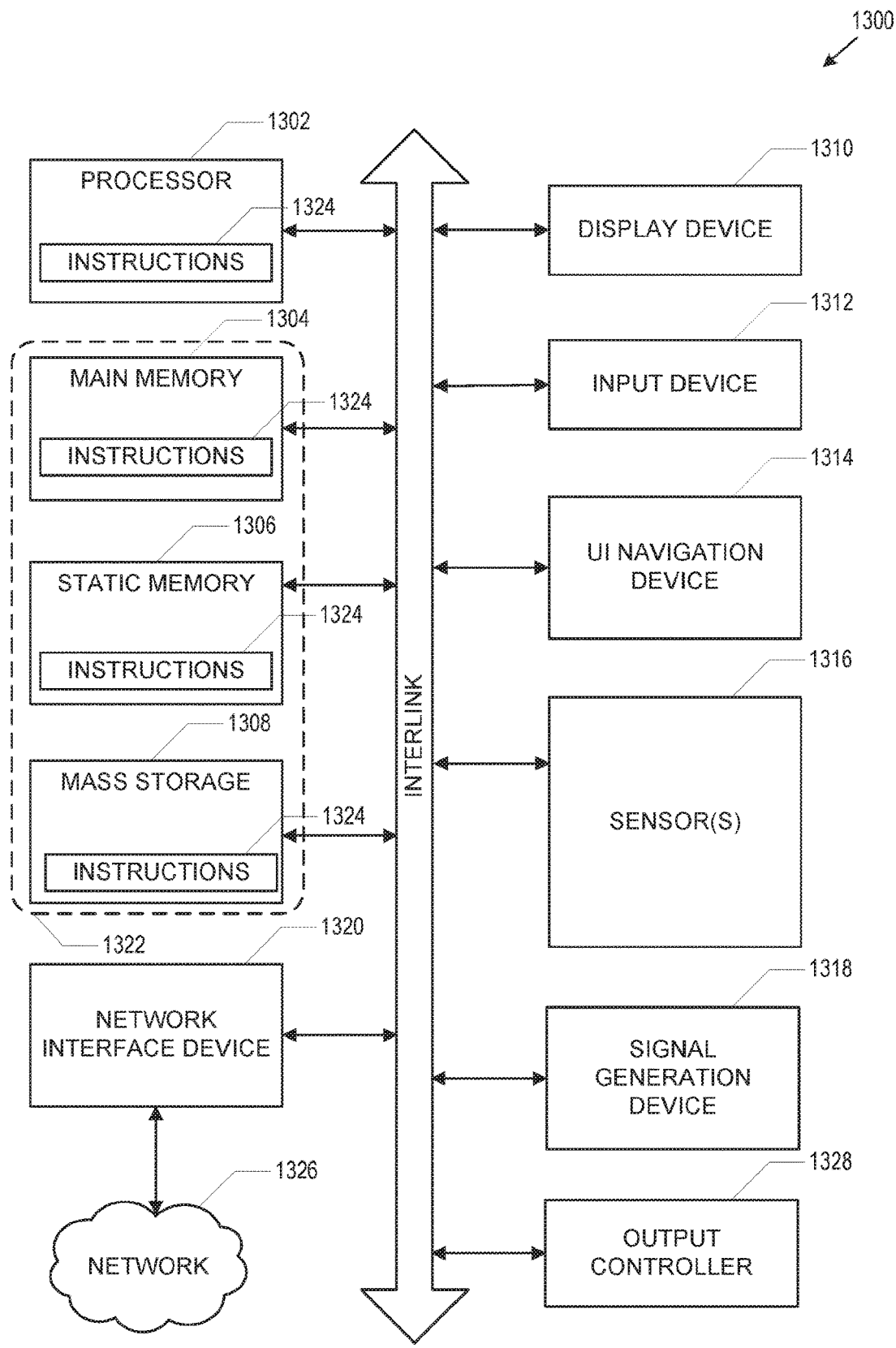
FIG. 13 illustrates a block diagram of a communication device such as an evolved Node-B (eNB), a new generation Node-B (gNB), an access point (AP), a wireless station (STA), or a user equipment (UE), in accordance with some aspects.

FIG. 13 illustrates a block diagram of a communication device such as an evolved Node-B (eNB), a new generation Node-B (gNB), an access point (AP), a wireless station (STA), or a user equipment (UE), in accordance with some aspects. In alternative aspects, the communication device 1300 may operate as a standalone device or may be connected (e.g., networked) to other communication devices. In a networked deployment, the communication device 1300 may operate in the capacity of a server communication device, a client communication device, or both in server-client network environments. In an example, the communication device 1300 may act as a peer communication device in peer-to-peer (P2P) (or other distributed) network environment. The communication device 1300 may be a UE, eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., UE) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The communication device 1300 may further include a display unit 1310, an alphanumeric input device 1312 (e.g., a keyboard), and a user interface (UI) navigation device 1314 (e.g., a mouse). In an example, the display unit 1310, input device 1312 and UI navigation device 1314 may be a touch screen display. The communication device 1300 may additionally include a storage device (e.g., drive unit) 1316, a signal generation device 1318 (e.g., a speaker), a network interface device 1320, and one or more sensors 1321, such as a global positioning system (GPS) sensor, compass, accelerometer, or other sensor. The communication device 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1316 may include a communication device readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the communication device 1300. In an example, one or any combination of the hardware processor 1302, the main memory 1304, the static memory 1306, or the storage device 1316 may constitute communication device readable media.

While the communication device readable medium 1322 is illustrated as a single medium, the term "communication device readable medium" may include a single medium or multiple media (e.g., a centralized or distributed database, and/or associated caches and servers) configured to store the one or more instructions 1324.

The term "communication device readable medium" may include any medium that is capable of storing, encoding, or carrying instructions for execution by the communication device 1300 and that cause the communication device 1300 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), MIMO, or multiple-input single-output (MISO) techniques. In some examples, the network interface device 1320 may wirelessly communicate using Multiple User MIMO techniques. The term "transmission medium" shall be taken to include any intangible medium that is capable of storing, encoding or carrying instructions for execution by the communication device 1300, and includes digital or analog communications signals or other intangible medium to facilitate communication of such software.

ADDITIONAL NOTES AND EXAMPLES

Example 1 is an apparatus of a user equipment (UE), the apparatus comprising: processing circuitry, the processing circuitry configured to: decode signaling indicating a duration of a time window, the time window comprising a plurality of shorter transmission time intervals (S-TTIs) forming a single TTI; detect absence of a discontinuous reception (DRX) indicator within control information received within a first S-TTI of the plurality of S-TTIs; upon detecting the absence of the DRX indicator within received control information, monitor a shorter physical downlink control channel (S-PDCCH) within each of the plurality of S-TTIs during the duration; decode scheduling information received via the S-PDCCH within one of the plurality of S-TTIs; and encode data for transmission on a shared data channel based on the scheduling information; and memory coupled to the processing circuitry, the memory configured to store the time window duration.

In Example 2, the subject matter of Example 1 includes, wherein the signaling comprises radio resource configuration (RRC) signaling received on a physical downlink shared channel (PDSCH).

In Example 3, the subject matter of Examples 1-2 includes, wherein the time window is a subframe, and the duration is 1 millisecond (ms).

In Example 4, the subject matter of Examples 1-3 includes, wherein the control information comprises downlink control information (DCI) received via the S-PDCCH of the first S-TTI.

In Example 5, the subject matter of Examples 1-4 includes, wherein the processing circuitry is configured to: decode a second control information received within a second time period, wherein the second control information comprises a DRX indicator, and the second time period comprises a second plurality of S-TTIs.

In Example 6, the subject matter of Example 5 includes, wherein the second control information comprises a downlink control information (DCI) format received via a PDCCH within a first S-TTI of the second plurality of S-TTIs.

In Example 7, the subject matter of Example 6 includes, wherein the processing circuitry is configured to: upon detecting the DRX indicator, discontinue S-PDCCH monitoring within the second plurality of S-TTIs of the second time period.

In Example 8, the subject matter of Example 7 includes, wherein the processing circuitry is configured to: encode the data for transmission on the shared data channel based on scheduling information received via the S-PDCCH within the first S-TTI of the second plurality of S-TTIs.

In Example 9, the subject matter of Examples 7-8 includes, wherein the DRX indicator comprises a one-bit flag indicating discontinuation of the S-PDCCH monitoring.

In Example 10, the subject matter of Examples 7-9 includes, wherein the DRX indicator is one of UE-specific or cell-specific.

In Example 11, the subject matter of Examples 7-10 includes, wherein the DRX indicator comprises a two-bit flag, wherein a first bit of the flag indicates discontinuation of the S-PDCCH monitoring for uplink (UL) scheduling grants, and a second bit of the flag indicates discontinuation of the S-PDCCH monitoring for downlink (DL) scheduling grants within the second plurality of S-TTIs of the second time period.

In Example 12, the subject matter of Examples 7-11 includes, wherein the DRX indicator comprises a time duration field, the time duration field indicating one or more time periods during which S-PDCCH monitoring within a plurality of S-TTIs associated with the one or more time periods is discontinued.

In Example 13, the subject matter of Examples 6-12 includes, wherein: the DRX indicator is associated with a first cell radio network temporary identifier (C-RNTI) of a first cell; and the DCI format further comprises a second DRX indicator associated with a second C-RNTI of a second cell.

In Example 14, the subject matter of Example 13 includes, wherein the processing circuitry is configured to: perform S-PDCCH monitoring within the second plurality of S-TTIs associated with the first cell and the second cell, based on the DRX indicator and the second DRX indicator; and encode the data for transmission using a first component carrier of the first cell and a second component carrier of the second cell, based on scheduling information received from the S-PDCCH monitoring within the second plurality of S-TTIs associated with the first cell and the second cell.

In Example 15, the subject matter of Examples 1-14 includes, transceiver circuitry coupled to the processing circuitry; and, one or more antennas coupled to the transceiver circuitry.

Example 16 is a non-transitory computer-readable storage medium that stores instructions for execution by one or more processors of a user equipment (UE), the instructions to configure the one or more processors to cause the UE to: decode signaling enabling shorter transmission time interval (S-TTI) mode during a time window, the time window comprising a plurality of S-TTIs forming a single TTI; monitor during the S-TTI mode, a shorter physical downlink control channel (S-PDCCH) within each of the plurality of S-TTIs; decode scheduling information received via the S-PDCCH within one of the plurality of S-TTIs; and encode data for transmission on a shared data channel based on the scheduling information.

In Example 17, the subject matter of Example 16 includes, wherein the one or more processors further cause the apparatus of the wireless device to: decode downlink control information (DCI) received within a first S-TTI of the plurality of S-TTIs, the DCI comprising a discontinuous reception (DRX) indicator; and upon detecting the DRX indicator, discontinue S-PDCCH monitoring within a remaining portion of the plurality of S-TTIs.

In Example 18, the subject matter of Example 17 includes, wherein the DRX indicator comprises a one-bit flag indicating discontinuation of the S-PDCCH monitoring.

In Example 19, the subject matter of Examples 17-18 includes, wherein the DRX indicator comprises a two-bit flag, wherein a first bit of the flag indicates discontinuation of the S-PDCCH monitoring for uplink (UL) scheduling grants, and a second bit of the flag indicates discontinuation of the S-PDCCH monitoring for downlink (DL) scheduling grants within the plurality of S-TTIs of the time window.

In Example 20, the subject matter of Example 19 includes, wherein the DRX indicator further comprises a time duration field, the time duration field indicating one or more time windows during which S-PDCCH monitoring within a plurality of S-TTIs associated with the one or more time windows is discontinued.

In Example 21, the subject matter of Examples 17-20 includes, wherein the one or more processors further cause the apparatus of the wireless device to: decode an S-TTI release indicator within the DCI; and deactivate the S-TTI mode in response to the S-TTI release indicator.

In Example 22, the subject matter of Examples 17-21 includes, wherein the DCI is a legacy DCI and cyclic redundancy check (CRC) parity bits obtained for the S-PDCCH are scrambled with cell radio network temporary identifier (C-RNTI) associated with a DRX indicator.

In Example 23, the subject matter of Examples 16-22 includes, wherein at least another S-TTI of the plurality of S-TTIs includes scheduling information for a second UE.

Example 24 is an apparatus of a Node-B (NB), the apparatus comprising: memory; and processing circuitry, configured to: determine a duration of a time window based on one or more UE-specific measurements, the time window comprising a plurality of shorter transmission time intervals (S-TTIs) forming a single TTI; encode higher layer signaling indicating the determined duration and causing activation of S-TTI monitoring mode within a cell of the NB during the determined duration; encode scheduling information for transmission using a shorter physical downlink control channel (S-PDCCH) within the plurality of S-TTIs, wherein the scheduling information comprises uplink (UL) or downlink (DL) scheduling grant for a plurality of users equipments (UEs) within the cell; and decode data received on a shared data channel in response to the scheduling information.

In Example 25, the subject matter of Example 24 includes, wherein the scheduling information comprises a first UL grant and a second UL grant, the first and second UL grants for a same UE within the cell.

In Example 26, the subject matter of Examples 24-25 includes, wherein the scheduling information comprises a first UL grant for a first UE within the cell and a second UL grant for a second UE within the cell.

In Example 27, the subject matter of Examples 24-26 includes, wherein the processing circuitry is configured to: determine a number of the S-TTIs within the single TTI based on the UE-specific measurements.

In Example 28, the subject matter of Examples 24-27 includes, wherein the UE-specific measurements comprise one or more of a signal quality measurement, a device location, and a device moving speed.

In Example 29, the subject matter of Examples 24-28 includes, wherein the processing circuitry is configured to: encode downlink control information (DCI) for transmission, the DCI comprising at least one DRX indicator and at least one S-TTI release indicator.

In Example 30, the subject matter of Example 29 includes, wherein the at least one S-TTI release indicator causes deactivation of the S-TTI monitoring mode within the cell.

In Example 31, the subject matter of Examples 29-30 includes, wherein the DRX indicator is one of UE-specific or cell-specific.

In Example 32, the subject matter of Examples 29-31 includes, wherein the DRX indicator comprises a two-bit flag, wherein a first bit of the flag indicates discontinuation of S-PDCCH monitoring for UL scheduling grants, and a second bit of the flag indicates discontinuation of S-PDCCH monitoring for DL scheduling grants within the plurality of S-TTIs of the time window.

In Example 33, the subject matter of Example 32 includes, wherein the DRX indicator further comprises a time duration field, the time duration field indicating one or more time windows during which S-PDCCH monitoring within a plurality of S-TTIs associated with the one or more time windows is discontinued.

In Example 34, the subject matter of Examples 24-33 includes, wherein the NB is one of a Next Generation Node-B (gNB) or an Evolved Node-B (eNB).

Example 35 is an apparatus of a user equipment (UE), the apparatus comprising: means for decoding signaling enabling shorter transmission time interval (S-TTI) mode during a time window, the time window comprising a plurality of S-TTIs forming a single TTI; means for monitoring during the S-TTI mode, a shorter physical downlink control channel (S-PDCCH) within each of the plurality of S-TTIs; means for decoding scheduling information received via the S-PDCCH within one of the plurality of S-TTIs; and means for encoding data for transmission on a shared data channel based on the scheduling information.

In Example 36, the subject matter of Example 35 includes, means for decoding downlink control information (DCI) received within a first S-TTI of the plurality of S-TTIs, the DCI comprising a discontinuous reception (DRX) indicator; and means for discontinuing S-PDCCH monitoring within a remaining portion of the plurality of S-TTIs, upon detecting the DRX indicator.

In Example 37, the subject matter of Example 36 includes, wherein the DRX indicator comprises a one-bit flag indicating discontinuation of the S-PDCCH monitoring.

In Example 38, the subject matter of Examples 36-37 includes, wherein the DRX indicator comprises a two-bit flag, wherein a first bit of the flag indicates discontinuation of the S-PDCCH monitoring for uplink (UL) scheduling grants, and a second bit of the flag indicates discontinuation of the S-PDCCH monitoring for downlink (DL) scheduling grants within the plurality of S-TTIs of the time window.

In Example 39, the subject matter of Example 38 includes, wherein the DRX indicator further comprises a time duration field, the time duration field indicating one or more time windows during which S-PDCCH monitoring within a plurality of S-TTIs associated with the one or more time windows is discontinued.

Example 40 is at least one machine-readable medium including instructions that, when executed by processing circuitry, cause the processing circuitry to perform operations to implement of any of Examples 1-39.

Example 41 is an apparatus comprising means to implement of any of Examples 1-39.

Example 42 is a system to implement of any of Examples 1-39.

Example 43 is a method to implement of any of Examples 1-39.

Although an aspect has been described with reference to specific example aspects, it will be evident that various modifications and changes may be made to these aspects without departing from the broader scope of the present disclosure. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

What is claimed is:

1. An apparatus comprising:
    at least one processor configured to cause a user equipment (UE) to:
        decode signaling indicating a duration of a time window, the time window comprising a plurality of shorter transmission time intervals (S-TTIs) forming a single TTI;
        detect absence of a discontinuous reception (DRX) indicator within control information received within a first S-TTI of the plurality of S-TTIs;
        upon detecting the absence of the DRX indicator within received control information, monitor a shorter physical downlink control channel (S-PDCCH) within each of the plurality of S-TTIs during the duration;
        decode scheduling information received via the S-PDCCH within one of the plurality of S-TTIs; and
        encode data for transmission on a shared data channel based on the scheduling information.

2. The apparatus of claim 1, wherein the signaling comprises radio resource configuration (RRC) signaling received on a physical downlink shared channel (PDSCH).

3. The apparatus of claim 1, wherein the time window is a subframe, and the duration is 1 millisecond (ms).

4. The apparatus of claim 1, wherein the control information comprises downlink control information (DCI) received via the S-PDCCH of the first S-TTI.

5. The apparatus of claim 1, further comprising transceiver circuitry coupled to the at least one processor; and, one or more antennas coupled to the transceiver circuitry.

6. The apparatus of claim 1, wherein the at least one processor is configured to:
    decode a second control information received within a second time period, wherein the second control information comprises a DRX indicator, and the second time period comprises a second plurality of S-TTIs.

7. The apparatus of claim 6, wherein the second control information comprises a downlink control information (DCI) format received via a PDCCH within a first S-TTI of the second plurality of S-TTIs.

8. The apparatus of claim 7, wherein:
the DRX indicator is associated with a first cell radio network temporary identifier (C-RNTI) of a first cell; and
the DCI format further comprises a second DRX indicator associated with a second C-RNTI of a second cell.

9. The apparatus of claim 8, wherein the at least one processor is configured to:
perform S-PDCCH monitoring within the second plurality of S-TTIs associated with the first cell and the second cell, based on the DRX indicator and the second DRX indicator; and
encode the data for transmission using a first component carrier of the first cell and a second component carrier of the second cell, based on scheduling information received from the S-PDCCH monitoring within the second plurality of S-TTIs associated with the first cell and the second cell.

10. The apparatus of claim 7, wherein the at least one processor is configured to:
upon detecting the DRX indicator, discontinue S-PDCCH monitoring within the second plurality of S-TTIs of the second time period.

11. The apparatus of claim 10, wherein the at least one processor is configured to:
encode the data for transmission on the shared data channel based on scheduling information received via the S-PDCCH within the first S-TTI of the second plurality of S-TTIs.

12. The apparatus of claim 10, wherein the DRX indicator comprises a one-bit flag indicating discontinuation of the S-PDCCH monitoring.

13. The apparatus of claim 10, wherein the DRX indicator is one of UE-specific or cell-specific.

14. The apparatus of claim 10, wherein the DRX indicator comprises a two-bit flag, wherein a first bit of the flag indicates discontinuation of the S-PDCCH monitoring for uplink (UL) scheduling grants, and a second bit of the flag indicates discontinuation of the S-PDCCH monitoring for downlink (DL) scheduling grants within the second plurality of S-TTIs of the second time period.

15. The apparatus of claim 10, wherein the DRX indicator comprises a time duration field, the time duration field indicating one or more time periods during which S-PDCCH monitoring within a plurality of S-TTIs associated with the one or more time periods is discontinued.

16. A non-transitory computer-readable storage medium that stores instructions for execution by one or more processors of a user equipment (UE), the instructions to configure the one or more processors to cause the UE to:
decode signaling enabling shorter transmission time interval (S-TTI) mode during a time window, the time window comprising a plurality of S-TTIs forming a single TTI;
monitor during the S-TTI mode, a shorter physical downlink control channel (S-PDCCH) within one or more of the plurality of S-TTIs;
decode scheduling information received via the S-PDCCH within one of the plurality of S-TTIs; and
encode data for transmission on a shared data channel based on the scheduling information.

17. The non-transitory computer-readable storage medium of claim 16, wherein the one or more processors further cause the apparatus of the wireless device to:
decode downlink control information (DCI) received within a first S-TTI of the plurality of S-TTIs, the DCI comprising a discontinuous reception (DRX) indicator; and
upon detecting the DRX indicator, discontinue S-PDCCH monitoring within a remaining portion of the plurality of S-TTIs.

18. The non-transitory computer-readable storage medium of claim 17, wherein the DRX indicator comprises a one-bit flag indicating discontinuation of the S-PDCCH monitoring.

19. The non-transitory computer-readable storage medium of claim 17, wherein the DRX indicator comprises a two-bit flag, wherein a first bit of the flag indicates discontinuation of the S-PDCCH monitoring for uplink (LTL) scheduling grants, and a second bit of the flag indicates discontinuation of the S-PDCCH monitoring for downlink (DL) scheduling grants within the plurality of S-TTIs of the time window.

20. The non-transitory computer-readable storage medium of claim 19, wherein the DRX indicator further comprises a time duration field, the time duration field indicating one or more time windows during which S-PDCCH monitoring within a plurality of S-TTIs associated with the one or more time windows is discontinued.

21. An apparatus comprising: at least one processor, configured to cause a base station to:
determine a duration of a time window, the time window comprising a plurality of shorter transmission time intervals (S-TTIs) forming a single TTI;
encode higher layer signaling indicating the determined duration and causing activation of S-TTI monitoring mode associated with a cell of the base station during the determined duration;
encode scheduling information for transmission using a shorter physical downlink control channel (S-PDCCH) within the plurality of S-TTIs, wherein the scheduling information comprises uplink (UL) or downlink (DL) scheduling grant for a plurality of users equipments (UEs) associated with the cell; and
decode data received on a shared data channel in response to the scheduling information.

22. The apparatus of claim 21, wherein the scheduling information comprises a first UL grant and a second UL grant, the first and second LTL, grants for a same UE within the cell.

23. The apparatus of claim 21, wherein the scheduling information comprises a first UL grant for a first UE within the cell and a second UL grant for a second UE within the cell.

24. The apparatus of claim 21, wherein the at least one processor is configured to:
determine a number of the S-TTIs within the single TTI based on the UE-specific measurements.

25. The apparatus of claim 21, wherein the UE-specific measurements comprise one or more of a signal quality measurement, a device location, and a device moving speed.

* * * * *